United States Patent [19]

Wraight et al.

[11] Patent Number: 4,810,876
[45] Date of Patent: Mar. 7, 1989

[54] LOGGING APPARATUS AND METHOD FOR DETERMINING ABSOLUTE ELEMENTAL CONCENTRATIONS OF SUBSURFACE FORMATIONS

[75] Inventors: Peter D. Wraight; Russel C. Hertzog, both of Missouri City, Tex.; Darwin V. Ellis, Ridgefield, Conn.; Hubert D. Scott, Houston, Tex.; Jeffrey S. Schweitzer, Ridgefield; James A. Grau, Danbury, both of Conn.

[73] Assignee: Schlumberger Technology Corporation, New York, N.Y.

[21] Appl. No.: 905,371

[22] Filed: Sep. 5, 1986

[51] Int. Cl.$^4$ ............................................. G01V 5/00
[52] U.S. Cl. .................................. 250/256; 250/262; 250/270
[58] Field of Search ............... 250/256, 262, 269, 270; 364/422, 498

[56] References Cited

U.S. PATENT DOCUMENTS

| | | | |
|---|---|---|---|
| 3,521,064 | 7/1970 | Moran et al. | 250/269 |
| 3,665,195 | 5/1972 | Youmans | 250/270 |
| 3,928,763 | 12/1975 | Scott | 250/270 |
| 3,930,153 | 12/1975 | Scott | 250/262 |
| 3,930,154 | 12/1975 | Scott | 250/270 |
| 3,976,878 | 8/1976 | Chevalier et al. | 250/253 |
| 4,048,495 | 9/1977 | Ellis | 250/264 |
| 4,055,763 | 10/1977 | Antkiw | 250/270 |
| 4,208,580 | 6/1980 | Schweitzer et al. | 250/262 |
| 4,317,993 | 3/1982 | Hertzog, Jr. et al. | 250/270 |
| 4,394,574 | 7/1983 | Grau et al. | 250/262 |
| 4,464,569 | 8/1984 | Flaum | 250/270 |
| 4,524,274 | 6/1985 | Scott | 250/269 |
| 4,712,007 | 12/1987 | Ondrik | 250/256 |
| 4,717,825 | 1/1988 | Smith, Jr. et al. | 250/256 |
| 4,722,220 | 2/1988 | Herron | 250/256 |

OTHER PUBLICATIONS

Mellor, D. W. et al., "Formation Properties From High Resolution Neutron Activation Gamma-Ray Spectra", SPWLA Symposium (England, Jun. 1985).
Fanger, U. et al., "Development of In-Situ Mineral Exploration Methods by Means of Cf-252x", Nuclear Field Analysis, 1975.
Wormald, M. R. et al., "In-Situ Analysis of Coal by Measurement of Neutron-Induced Prompt y-Rays", Int. J. App. Radiat. Isot. vol. 34, pp. 71–82, (1983).
Tittman, Jay, Geophysical Well Logging, Academic Press Inc., 1986, pp. 23–27.
Scott, H. D. et al., "The Aluminum Activation Log", SPWLA Symposium 1973.

(List continued on next page.)

Primary Examiner—Janice A. Howell
Attorney, Agent, or Firm—Chilton, Alix & Van Kirk

[57] ABSTRACT

Logging apparatus and methods for detecting first signals indicative of the absolute concentrations of the first category of elements in the rock matrix, for irradiating the formation with a pulse of high energy neutrons and for detecting a second signal indicative of the relative concentrations of a second category of elements in a rock matrix. The absolute and relative concentrations of a plurality of elements are determined, and this information is used to transform at least one of the relative concentrations into an absolute concentration. One of the measured absolute concentrations is for aluminum, from which correlations are used to determine the absolute concentrations of other, non-measured elements. A tool system for measuring the absolute aluminum concentration includes a californium-252 source and a gamma ray detector having a plurality of windows from which the aluminum count rate can be compensated for interference by manganese activation. A further correction to the aluminum count rate has a functional dependence on the neutron slowing down length in the formation, the formation macroscopic cross section, the borehole microscopic cross section, the bulk density of the formation, and the borehole diameter. When used in conjunction with a density tool sensitve to the effects of photoelectric absorption of gamma rays in the formation, the techniques of the invention allow the magnesium concentration to be determined.

81 Claims, 9 Drawing Sheets

OTHER PUBLICATIONS
(See top sheet)

Fanger, U. et al., "Kernforschungszentrum Karlsruhe", Nuclear Field Analysis, (Germany, Jun. 1971), pp. 1–14.

Herron, M. M., "Mineralogy from Geochemical Well Logging", Clays and Clay Minerals, vol. 34, pp. 204–213, 1986.

Ellis, D. V. "Neutron Porosity Devices–What Do They Measure?", First Break, vol. 4, No. 3 (Oct. 1986), pp. 11–16.

Ellis, D. et al., "Litho-Density Tool Calibration", Society of Petroleum Engineers, 1985, pp. 515–520.

Senftle, F. E. et al., "In-Situ Analysis of Coal Using A 252Cf-Ge(Li)", Society of Mining Engineering, pp. 666–674, 1978.

Aylmer, et al., "Quantitative Borehole Logging of Manganese Ore by Prompt Neutron-Gamma and Neutron Activation Methods", SPWLA Twenty-Fifth Annual Logging Symposium, D, Jun. 10–14, 1985.

Mikesell, et al., "Borehole Field Calibration and Measurement of Low-Concentration Manganese by Decay Gamma Rays", Geophysics, vol. 51, No. 12, (Dec. 1986); pp. 2219–2224.

Landstrom, et al., "Field Experiments on the Application of Neutro Activation Techniques to In-Situ Borehole Analysis", Geoexploration Elsevier Publishing Company, Amsterdam, pp. 23–39.

Eisler, et al., "Nuclear Activation Logging for Aluminium in Iron Ores and Coal", Geoexploration, 17 (1979), pp. 43–53.

LOGGING APPARATUS AND METHOD FOR DETERMINING ABSOLUTE ELEMENTAL CONCENTRATIONS OF SUBSURFACE FORMATIONS

BACKGROUND OF THE INVENTION

This invention relates to investigating earth formations traversed by a borehole. More particularly, the present invention is directed to apparatus and methods for determining element concentration values for, and for further characterizing the attributes of, the formations surrounding a bore hole, by on-line processing of well logging data. Accordingly, the general objects of the present invention are to provide novel and improved methods and apparatus of such character.

In copending U.S. patent application Ser. No. 770,802, filed Aug. 29, 1985, and assigned to the assignee of the present invention, a method is disclosed for determining the values of formation attributes by transforming a column vector of formation elemental concentrations, into a column vector of mineral abundances. The basis for the method can be expressed by the equation:

$$(M) = (A)^{-1} \cdot (E)$$

which transforms the concentration of the elements (E) in the formation into the weight percentage of the dominant minerals (M) in the formation.

The method described in said copending application has been shown to agree reasonably well with the quantification and characterization of minerals in selected geological formations, when compared with the mineral analyses of actual core samples taken from these formations. To date, however, the method of said copending application has, in practice, relied upon constructing the column element matrix and/or the transformation matrix with entries taken at least in part from core samples or equivalent direct analyses of the formation. This is because no on-line logging techniques available to date are suitable for determining the concentration of all elements necessary for the column matrix with the required degree of accuracy.

The capital cost of drilling and evaluating a deep well, for example an oil or natural gas well, is extremely high, and for this reason considerable expense is incurred during those time intervals when drilling or production steps must be interrupted to evaluate the formation. With known analysis techniques, the concentration of some elements might be derivable from wire-line logging of the formation, but the concentrations of other elements would require the taking of core samples for analysis.

U.S. Pat. No. 3,665,195 entitled "Thermal Neutron Activation Radioactivity Logging Method" discloses a method of determining the existence and quantity of an element in a formation, by irradiating the formation with neutrons and detecting the induced gamma ray activity from the element of interest. After determining the thermal neutron capture cross section of the formation, the product of the gamma ray emission and the thermal neutron capture cross section is obtained as a quantitative indication of the element's abundance in the formation.

In the technical article "The Aluminum Activation Log" by H. D. Scott and M. P. Smith published in 1973, there is described a method for measuring the aluminum content of the formation, in order to estimate the formation shale fraction. A californium-252 source of neutrons is used in conjunction with the formation thermal neutron capture cross section to produce a continuous activation log of a borehole.

In U.S. Pat. No. 4,464,569 entitled "Method and Apparatus for Spectroscopic Analysis of a Geological Formation", a method is disclosed for determining basic formation component volume fractions. Relative spectral elemental yields indicative of the presence of chemical elements in the formation are obtained from a spectroscopic analysis of capture gamma ray spectra obtained from a neutron spectroscopy logging tool. The relative sensitivities of the logging tool to the specific minerals or to the chemical elements in the formation are determined either from core analysis or from tests run in known formations. The spectroscopic elemental yields and the relative sensitivities are then used together to determine the volume fractions of the basic formation components such as limestone, sandstone, porosity, salinity, dolomite, anhydrite, etc. Finally, the determined volume fractions are recorded on a storage medium.

Although the purpose of the invention described in the above-referenced patent is to determine formation basic component volume fractions, the technique does not require, and the patent does not disclose, a straightforward way for determining elemental concentrations, especially through the use of commonly available logging tools or modifications thereof. The method of the '569 patent takes appropriate combinations of measured yields, normalizes core data or laboratory measurements to obtain calibrated relative sensitivities and makes use of the constraint that the sum of all volume fractions is unity. Values of the volume fractions can then be found by solving the appropriate set of equations for the formation component volume fractions.

On-line techniques are available for determining relative concentrations of some formation elements. U.S. Pat. No. 3,521,064 entitled "Analysis of Gamma Ray Energy Spectrum For Constituent Identification", is representative of these methods. U.S. Pat. No. 3,928,763 entitled "Measurement of Subsurface Formation Lithology, Including Shaliness, Using Capture Gamma Spectroscopy," and U.S. Pat. Nos. 3,930,153 and 3,930,154 which contain substantially the same disclosure, teach utilization of a weighted least squares spectral fitting technique similar to that described in the '064 patent for obtaining relative elemental yields of elements contributing to a spectrum. Information bearing on the macroscopic neutron cross section is then used in a processing technique which derives further information relating to the volume fractions of the basic formation components such as sandstone, limestone, etc.

It should thus be appreciated that full realization of the significant advantages associated with the use of a transformation matrix to quantify the mineralogy from elemental concentrations cannot be readily achieved using element concentration techniques available in the prior art. In particular, known techniques and apparatus are not suitable for readily and accurately determining the concentrations of all significant elements of a formation, as needed for characterizing and quantifying the formation, by driving a single tool string through the borehole. The capability of measuring and recording the elemental concentrations and evaluating the mineralogy and other significant characteristics of the formation by means of a single tool pass, substantially immediately, would represent a significant advance in the art of subsurface formation logging.

SUMMARY OF THE INVENTION

The present invention is directed to logging apparatus and processing methods for determining elemental concentrations, which are useful as such, and which are suitable for use in a generalized technique for assessing the mineralogy of a formation.

Absolute concentrations of all significant formation elements have been extremely difficult to obtain directly from on-line tool logging measurements. The overall method of the present invention is based on an indirect approach that in part relies upon certain unique assumptions. These assumptions are necessary because the logging tools are affected by contributions of the borehole itself, the variations in the environment surrounding the tool, and inherent uncertainty of the strength of the neutron sources typically used in such tools. The key elements of the indirect approach underlying the overall method of the invention include:

1. Manipulating the measureable relative concentration data on a weight-per cent basis by dividing each elemental yield by its relative weight-per cent sensitivity, which has either been calculated or measured in the laboratory;

2. Circumventing the bore hole effect by considering only the elements contained in the formation matrix;

3. Assuming that the weight-per cent of unmeasured matrix oxygen is constant (about 50%);

4. Assuming that the weight-per cent of unmeasured matrix carbon correlates with calcium;

5. Assuming that the other elements which are not measured, but which can contribute substantially to the total weight, correlate with aluminum;

6. Requiring that all rock matrix weight-per cent contributions add up to 100%.

In accordance with the overall method, concentrations of four categories of formation elements are first determined. These categories are (I) element absolute concentrations that can be directly measured or calculated, (II) element relative concentrations that can be measured or calculated, (III) element absolute concentrations that can be correlated to concentrations of other elements, and (IV) concentrations of residual elements that are not otherwise accounted for. Preferably, the elements in category I include aluminum, potassium, thorium and uranium. The elements in category II preferably include calcium, silicon, iron, and sulfur and may include gadolinium, titanium and potassium. The elements in category III include carbon, titanium, and sodium, which are derived from the calcium and aluminum values', and may also include potassium, manganese and magnesium. The and the elements of category IV are assumed to be adequately accounted for by a representation of the oxygen concentration. Concentrations of elements within these four categories are preferably determined by utilizing known logging tools to the extent possible, and by modifying such tools and associated algorithms where necessary to determine concentrations that cannot readily be determined on-line using known techniques.

After the steps of logging the formation to obtain data on each of the element categories I through IV above have been accomplished, a procedure is followed in accordance with the method, for solving an equation having the general form:

$$\sum_j W_j + \sum_i W_i + \sum_u W_u + W = 100 \qquad (Eq.\ 1)$$

and the preferred form:

$$\sum_j W_j + F \sum_i Y_i/S_i + \sum_u \sum_k C_{u,k} X_k + W = 100$$

Each term on the left hand side, when taken in order, corresponds to the weight per cent of the elements in categories I through IV, respectively. After determining the absolute concentrations for elements in categories I and III and making the assumption regarding oxygen, the equation reduces to solving for F, the denormalization factor for elements in category II and any elements in category III that depend on the concentration of a category II element. Once F is determined, the concentration of each category (II) element (and any dependent category III element) is found by multiplying each relative weight per cent, $(Y_i/S_i)$ by F, where $Y_i$ are the relative yields and $S_i$ are the tool relative sensitivities.

As a subfeature of the overall method of the present invention, an improved method has been developed for refining the determination of the elemental yields for the elements in category II above. The yields for these elements have typically been determined by a gamma ray spectroscopy tool, preferably of the type known in the industry as the GST, tool which is a trademark of Schlumberger Technology Corp. The new technique for determining the element yields through an improved analysis of the spectrum obtained in such tools, hereinafter the "composite standard spectrum technique", is particularly adapted for use in formations having a significant clay content. The result of the implementation of this aspect of the invention is fed into the overall method represented by the above equation.

The significant features of the composite standard spectrum technique include the measurement of the residual standard spectrum by stripping from a spectrum measured in a zone containing substantial amounts of clay, the spectra characteristic of well understood elements such as silicon, calcium, chlorine, iron, sulfur, and hydrogen. This residual spectrum is then included in the analysis as an additional standard, referred to hereinafter as the "shale standard". The shale standard would typically contain contributions from the elements gadolinium, samarium, titanium, potassium, aluminum and sodium. Alternatively, individual standards for some or all of these six additional elements could be included in the analysis.

The present invention also includes three novel subfeatures relating to the elemental determinations in element category I, particularly for the determination of aluminum absolute concentration. These three features are a unique aluminum clay logging tool (ACT), which uses known tool sensors and techniques in a novel manner; a unique spectral enhancement technique for improving the accuracy of the aluminum count rate indication from the aluminum clay tool; and a count rate correction procedure for correcting the count rate of the tool to account for borehole and environmental effects. Thus, these three novel features are coordinated to determine the absolute concentration of aluminum in the formation by means of on-line well logging and associated data processing. The result of the correction procedure is then furnished to the device which solves the general Equation (1) set forth above.

The aluminum clay tool string is preferably configured to include at least four sections or tool modules. The upper tool consists of a natural gamma ray spectrometer tool such as the type known as the "NGT", which is a trademark of Schlumberger Technology Corp. Next, the a source of low energy neutrons, preferably Californium-252, is located below the NGT tool, for activating the formation. This is followed by another NGT tool adapted for measuring the activation gamma radiation resulting from thermal neutron capture by aluminum in the formation. Another tool, a gamma spectrometer tool such as the above-mentioned GST tool, follows the second NGT tool to provide a source of pulsed high energy neutrons for irradiating and analyzing the formation. The GST is adapted not only to measure elemental yields for the category II elements, but also provides data for use in determining the capture cross section of the formation, which is an input to the aluminum count rate correction procedure.

The gamma emission of interest for obtaining the aluminum concentration, i.e., count rate, is at 1779 keV. According to the invention, it has been discovered that the gamma ray energy windows utilized in the NGT for determining yields of naturally radioactive potassium, uranium, and thorium, can be used without substantial alteration for determining the yield of activated aluminum. The aluminum peak at 1779 keV falls at approximately the midpoint of the fourth of five windows provided on the NGT, which window has a range of approximately 1600-2000 keV. Some interference, however, with the aluminum 1779 keV line is caused by the activated manganese gamma line at 1811 keV.

In accordance with the novel feature directed to the spectral enhancement procedure of the present invention, compensation for the interfering manganese line at 1811 keV is accomplished by taking into account the manganese line at 847 keV, appearing in the second window. This line can be used to determine the contribution from the higher energy interfering line at 1811 keV, and to make appropriate correction to the aluminum count rate.

In accordance with a further novel feature of the invention relating to the determination of the concentration of aluminum, correction is made for the capture cross section of the formation, the capture cross section of the borehole, the borehole size, and the slowing down length of the neutrons. The corrected aluminum count rate takes the form:

$$(Al\ corrected)\ \frac{Al(CR)^*(L_s + k1)^*(SIGF = k2)^* (SIGBH)^{k3}}{RHOB^*(k4 + k5^*\exp(-CALI/k6))}$$

where $L_s$ is the slowing down length, SIGF is the formation capture cross section, SIGBH is the borehole capture cross section, RHOB is formation density, and CALI is the bore hole diameter.

The variables appearing in this correction procedure are derived from the GST, a compensated neutron tool such as is known under the trademark CNT from the assignee of the present invention, a density tool, a caliper tool, and measurements of borehole resistivity, temperature, or a priori, such that the correction can be made on-line.

Another novel feature of the invention is directed to a method for determining the absolute concentration of magnesium. Magnesium would normally be included as a contribution to the residual term W in equation, and therefore not separately determinable. By utilizing information available from a litho-density tool of the type known in the industry as the LDT tool, which is a trademark of Schlumberger Technology Corp., the absolute magnesium concentration can be inferred. This is accomplished by comparing the formation average photoelectric factor, $P_e$, determined from the LDT tool with a calculated value of $P_e$ based on the elemental concentrations obtained from the solution of equation 1. The difference is assumed to be commensurate with the magnesium concentration. Knowledge of the magnesium concentration in a formation can help distinguish dolomite from limestone, and therefore better quantify the porosity of the formation.

BRIEF DESCRIPTION OF THE DRAWINGS

The preferred embodiment of the invention will be described below with reference to the accompanying drawings, in which.

DESCRIPTION OF THE PREFERRED EMBODIMENT

Figure 1:
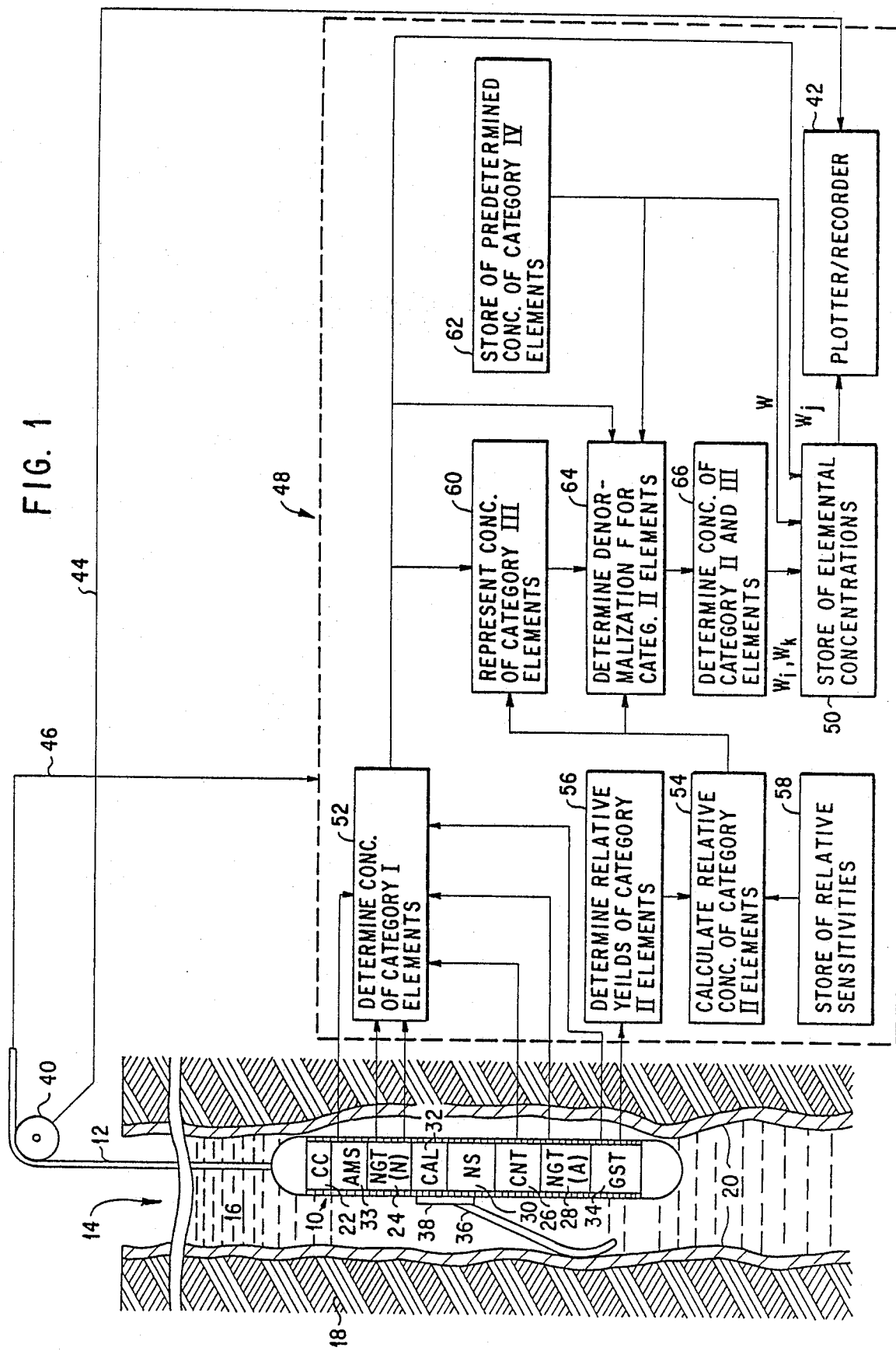
FIG. 1 is a schematic illustration of the overall system encompassed by the invention, including a sonde for deployment within the borehole, and the associated information processing system.

An illustrative embodiment of the apparatus and system embodying the overall method of the present invention is shown in FIG. 1. The borehole logging tool string 10 is suspended by an armoured cable 12 in the borehole 14. The borehole is typically filled with drilling mud 16 and is surrounded by earth formations 18. During drilling, the drilling mud deposits a solid layer of material on the borehole wall in the form of a mud cake 20.

The tool string 10 is depicted as containing a communications cartridge 22 and a plurality of sondes or tools 24-34. As more fully described below, these tools acquire data for input to the process of determining the absolute or relative concentrations of a plurality of elements, the results of which are used in an overall method for determining the concentrations of substantially all significant elements within the formation 18. The tool string 10 is typically lowered to the bottom of the borehole 14, and then raised at a controlled rate so that data can be acquired as a function of depth in the borehole, thereby permitting the determination of elemental concentrations of a selected group of elements at various depths in the earth formation.

It should be understood that reference herein to tools, sondes, detectors, tool systems, and the like are not to be construed as defining limitations on whether a particular function associated with a tool is to be performed by a single device or a plurality of devices, or whether such devices are contained within a single tool, or a plurality of tools drawn through the borehole 14 in tandem. For convenience, the term "tool system" as used herein, shall refer to one or more individual tools, or sondes that acquire data from the formation or borehole for use in determining a specific property or quantity of interest. Also, reference to patents or other publications in the following description should be understood to incorporate the material thereof into the present specification.

The tool string 10 includes a first tool system 24, 26, 28, 30, 32, 33 and 34 for use in determining the absolute weight fraction, (i.e., absolute concentration) of aluminum, which falls in a first category of elements in the formation. In the preferred embodiment, the first category of elements also includes preferably potassium, uranium, and thorium. Device 24 is, in the preferred embodiment, a tool for measuring the natural gamma radiation of potassium, and is also capable of measuring the natural radiation from uranium and thorium. The energy range of interest is from about zero to about 3 MeV, and the tool has a plurality of windows spanning this energy range. Such a tool is more fully described in U.S. Pat. No. 3,976,878, entitled "Natural Gamma Ray Spectrum Analysis Technique", the disclosure of which is hereby incorporated by reference. For convenience, this tool when operated in the natural gamma ray mode, will be referred to as NGT(N).

The first tool system will be discussed more fully below; for present purposes, one need only understand that the tool system includes a neutron source 30 for activating the aluminum in the formation, a detector 28 for detecting the delayed gamma emission resulting from neutron capture by the aluminum, and tools 26 33 and 34 which obtain measurements from the borehole and/or formation to be used in providing compensation and correction to the measurements obtained by the tool 28.

A second tool system 34 is provided for determining the relative elemental yields of a second category of elements, by irradiating the formation with neutrons and measuring the resulting gamma ray yields. An acceptable, although not preferred, embodiment of such a tool is described in U.S. Pat. No. 3,521,064, entitled "Analysis of Gamma Ray Energy Spectrum for Constituent Identification", and in U.S. Pat. No. 4,055,763, entitled "Neutron Characteristic and Spectroscopy Logging Methods and Apparatus". U.S. Pat. No. 4,317,993 entitled "Methods and Apparatus for Constituent Analysis of Earth Formations" describes an improvement to the basic tool. The disclosures of these three patents are hereby incorporated by reference. As described more fully below, the present invention includes an improvement to the techniques described in these three patents. For convenience, this second tool system, whether in the known form described in the reference patents, or in the improved form described below, will be referred to as the gamma spectroscopy tool (GST). The macroscopic absorption cross section of the formation is a gross property that is preferably obtained from tool 34, the GST. This cross section is utilized for determining the absolute concentration of aluminum in the formation. Thus, in the preferred embodiment, the GST 34 is part of the first tool system, as well as constituting the second tool system.

Tool 33 is typically of a type generally referred to as an additional or auxiliary measurement sub (AMS), for gathering gross or average properties of the formation or borehole. It measures borehole resistivity and borehole temperature from which the neutron capture cross section of the borehole can be calculated.

While the tool string 10 is moved through the borehole 14, an indication of its depth in the borehole is provided by a depth determining apparatus, generally indicated at 40, which is responsive to the movement of the cable 12, as it is let out and reeled in by a winch (not shown). The depth determining apparatus 40 is connected to a plotter/recorder 42 by a conventional, well-known cable-following device 44.

The data gathered by the string 10 is initially processed in the communications cartridge 22 and transmitted through the cable 12 by means of communication line 46 into the system processor 48. The system processor is typically located above ground, and operates in real time. The function of the system processor is to determine the elemental concentrations in the formation and store the values as shown at 50. A plot or recording of the elemental concentrations at various depths within the bore hole can be made at 42. Also, the concentrations of the elements needed to construct the element matrix (E) for the element to mineral transformation, can be obtained from store 50.

The generic process for determining the absolute elemental concentrations, or weight fractions, of the elements in formation 18 is summarized in block diagram form, within the dotted line encompassing the system processor 48. It should be understood that the user of the invention will typically have a need to determine the elemental concentrations of a selected group of elements in the formation, not necessarily that of every element. Although the generic method described herein is, in principle, not limited in the number of element concentrations which can be determined, as a practical matter the selected group of elements is typically expected to include less than about 20, typically about 12 to 15 elements. For example, copending U.S. patent application Ser. No. 770,820 is directed to a method for determining the values of formation attributes by transforming a column vector of formation elemental concentrations into a column vector of mineral abundances. The elemental concentrations of interest are chosen because they are useful in characterizing the mineral attributes of the formation. The present invention is not limited to use with the particular method described in said copending application, but may also be used whenever the need arises for determining the concentrations of selected elements in an earth formation.

In the embodiment to be described herein, the element aluminum is of major significance, primarily due to its importance in mineralogy and the strong correlation between aluminum and the concentrations of other elements which can be used to characterize the mineralogy of a formation. The overall, generic method for determining the absolute concentrations of all elements in the selected group can, however, be utilized for a different group of selected elements, and in situations where an element other than aluminum is of key significance.

With continued reference to FIG. 1, and particularly the system processor 48, the method and processing hardware associated with the generic implementation of the present invention will now be described. The signals from the tool string 10 are received within the system processor 48 through line 46. For illustrative purposes, the data input paths are grouped by first and second tool systems and are shown respectively being delivered directly into the functional blocks 52 and 56. In block 52 a determination is made of the absolute weight fractions of a first category of elements, including aluminum, and preferably potassium. It should be appreciated that if means were known for determining the absolute concentrations of all elements in the selected group, no additional processing would be necessary.

Techniques are available for determining the relative concentrations of several elements such as calcium, silicon, iron and sulphur. The information from the second spectroscopy tool 34 is processed within block 56 to determine the relative yields of this second category of elements and, when the yields are combined with the tool relative sensitivities stored in block 58, the relative concentrations of the category II block can be calculated in element 54.

According to the present invention, from the determination of the absolute concentrations of elements in category I, and the determination of relative concentrations of elements in category II, a substantially complete determination of element concentrations for the formation can be obtained from block 50. This is accomplished by representing in block 60 a third category of elements whose absolute or relative concentrations cannot be measured directly, but whose concentration can be correlated to the absolute or relative concentrations of the category I and category II elements. More particularly, applicant has invented a technique for accurately determining the absolute concentration of aluminum as one of the elements in category I and has further discovered that a number of significant, previously unmeasurable element concentrations can be strongly correlated with the absolute concentration of aluminum. Those elements in category III which cannot be correlated with aluminum are preferably correlated with the relative concentration of, for example, calcium from category II.

It has been found that even when the elements in categories I, II, and III can be taken into account, a substantial weight fraction of the formation is still not accounted for. Therefore, a fourth category of elements is represented in block 62, for the purpose of accounting for the residual mass of the formation. It can be appreciated that oxygen must be a major component of the elements in category IV.

If all the significant formation elements can be represented in one of categories I-IV, it should be appreciated that a denormalization factor can be found which, when applied to the relative concentrations determined for the category II elements, will permit a closed representation of the mass of the formation. In FIG. 1, block 64 represents the determination of the denormalization factor for the category II elements. Once this has been computed, the absolute concentrations of all elements in categories II and III are defined. Such concentrations are calculated in block 66 and temporarily or permanently stored in apparatus represented by block 50.

The representation of all elements in the formation by the four categories, and the step of determining the denormalization for the category II elements such that the absolute concentrations for all elements can be determined, are believed to be unique in this field of technology. Nevertheless, this elemental model of the formation is only a first step in the implementation of the preferred embodiment. Several factors detrimentally affect the ability to obtain accurate, absolute concentrations of both the category I and category II elements. Such factors include the uncertainties in neutron source strength for category II and the effect of the bore hole and other environmental influences on the neutron flux in the formation for both categories.

These problems have been overcome for category II elements in accordance with the preferred embodiment of the invention, by first, circumventing the borehole effect by including only those elements that are contained in the formation but not also in the borehole, and further, considering only the elements contained in the rock matrix of the formation (not in the formation fluid). Carbon and oxygen are not measured under this assumption, so a further assumption is made that the weight per cent of unmeasured matrix oxygen is constant (about 50%), and that the weight per cent of unmeasured matrix carbon correlates with the weight per cent of calcium. Thus, with these assumptions, and with the ability to accurately measure the absolute concentration of aluminum as set forth herein, the overall model described in FIG. 1 can be more easily implemented.

Figure 2:
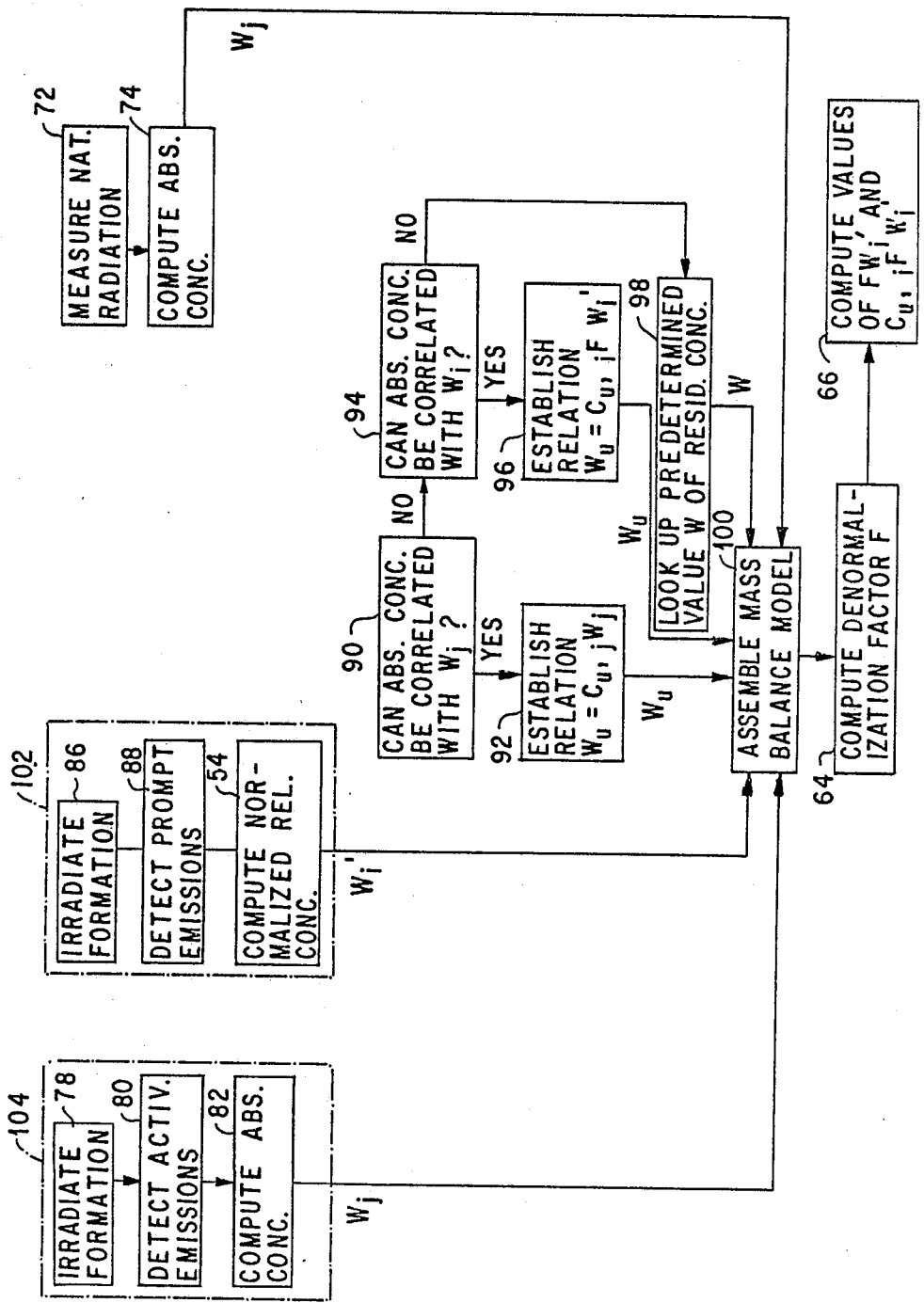
FIG. 2 is a flow diagram representing the logic associated with a generic implementation of the invention.

FIG. 2 is a flow chart representing the assumptions and process for carrying out the invention which was outlined generically in FIG. 1. The following description is keyed to both FIGS. 1 and 2. With respect to the makeup of the formation, a decision is made a priori as to which elements are to be included in the model. A determination is made as to whether the absolute concentration of a particular element can be measured from natural emission, or other passive technique. For such elements, means are provided for measuring the natural emission at block 72, and from the measured data, computing the concentration at block 74, which results in one or more absolute elemental concentrations $W_j$.

If it is determined a priori that absolute concentrations cannot be accurately measured from natural emission, a determination is made as to whether the absolute concentration can be determined from irradiation of the formation. If this can be accomplished, hardware is provided at block 78 for irradiating the formation, at block 80 for detecting the activated emissions, and at block 82 for computing the absolute concentrations of at least aluminum. The output of block 82 is a value of one or more absolute elemental concentrations, also represented by $W_j$. Thus, the outputs of blocks 74 and 82 are the values of the absolute elemental concentrations Wj, constituting the elements in category I shown in block 52 of FIG. 1.

If it has been determined a priori that the absolute concentrations cannot be measured, a determination is made as to whether the relative concentration of elements can be measured, e.g., by gamma ray spectral analysis. For these elements, hardware is provided at block 86 for irradiating the formation, at block 88 for detecting the prompt gamma emissions, and at block 54 for computing the normalized relative concentrations of these elements. The output of block 54 are values of elemental concentrations $W_i'$, normalized to an arbitrary standard which is typically not consistent with the absolute concentration $W_j$ of the category I elements. The relative concentration $W_i'$ is calculated preferably as $W_i' = Y_i/S_i$ where $Y_i$ is the measured count rate from element i and $S_i$ in the weight-percent sensitivity for element i.

When an element cannot be treated as a category I or category II element, a determination is made a priori in block 90 as to whether the absolute concentration of such element can be correlated with, preferably, the absolute concentration of an element $W_j$ of category I. If such correlation is known to exist or can be empirically determined a priori, then these elements of the third category are represented at block 92 in the form $W_u = C_{u,j} W_j$.

If it is determined that a correlation with the category I elements is not possible, then at block 94 a determination is made as to whether the absolute concentration of the element in question can be correlated with the concentration of an element in category II. If this is possible, then at block 96, the concentration of such category III elements is represented in the form $W_u = C_{u,i} F W_i'$ where F is a denormalization factor to be discussed more fully below.

If no correlation is suitable, then at block 98 a determination is made as to whether the element concentration can be established a priori. This weight fraction contribution is represented by W, and is in a sense an elemental residual.

In block 100, a mass balance model is constructed in which the weight fraction representations from blocks 82, 74, 54, 92, 96, and 98 are combined in accordance with the following equation:

$$\sum_j W_j + F \sum_i W_i' + \sum_u W_u + W = 100 \quad \text{(Eq. 2)}$$

F is the denormalization factor which is to be determined at each depth level within the formation where the elemental concentrations are required. As shown at block 64, the equation is solved for F and in block 66 the absolute concentrations of all elements in category II and of the elements represented in block 96, are computed.

In FIG. 2, a dashed box 102 indicates the subject matter of a subfeature of the present invention, directed to improving the method by which the accuracy of the relative concentrations of the elements in category II are determined. The details of this improvement will be discussed with respect to FIG. 4, below.

The other dashed box 104 in FIG. 2 represents another subfeature, directed to the improved tool hardware and associated method for determining the absolute concentration of a formation element, by use of a spectroscopy tool with a neutron source for creating delayed activity. In the preferred implementation of the embodiment, the absolute concentration of aluminum is determined according to the tool and method represented within box 104. The details of this subfeature of the invention are further set forth in connection with FIGS. 3 and 5-7. These details include the combination of tools carried by the sonde 10 as shown in FIG. 1 and the method by which the information obtained from the tools is converted to a count rate commensurate with the aluminum concentration in the formation, a method for enhancing the accuracy of the aluminum count rate to account for interferences in the aluminum activation spectrum by other elements (FIGS. 5 and 6), and a process for further correcting the aluminum enhanced count rate to account for environmental factors affecting the accuracy of the detectors (FIG. 3 and 7).

Figure 3:
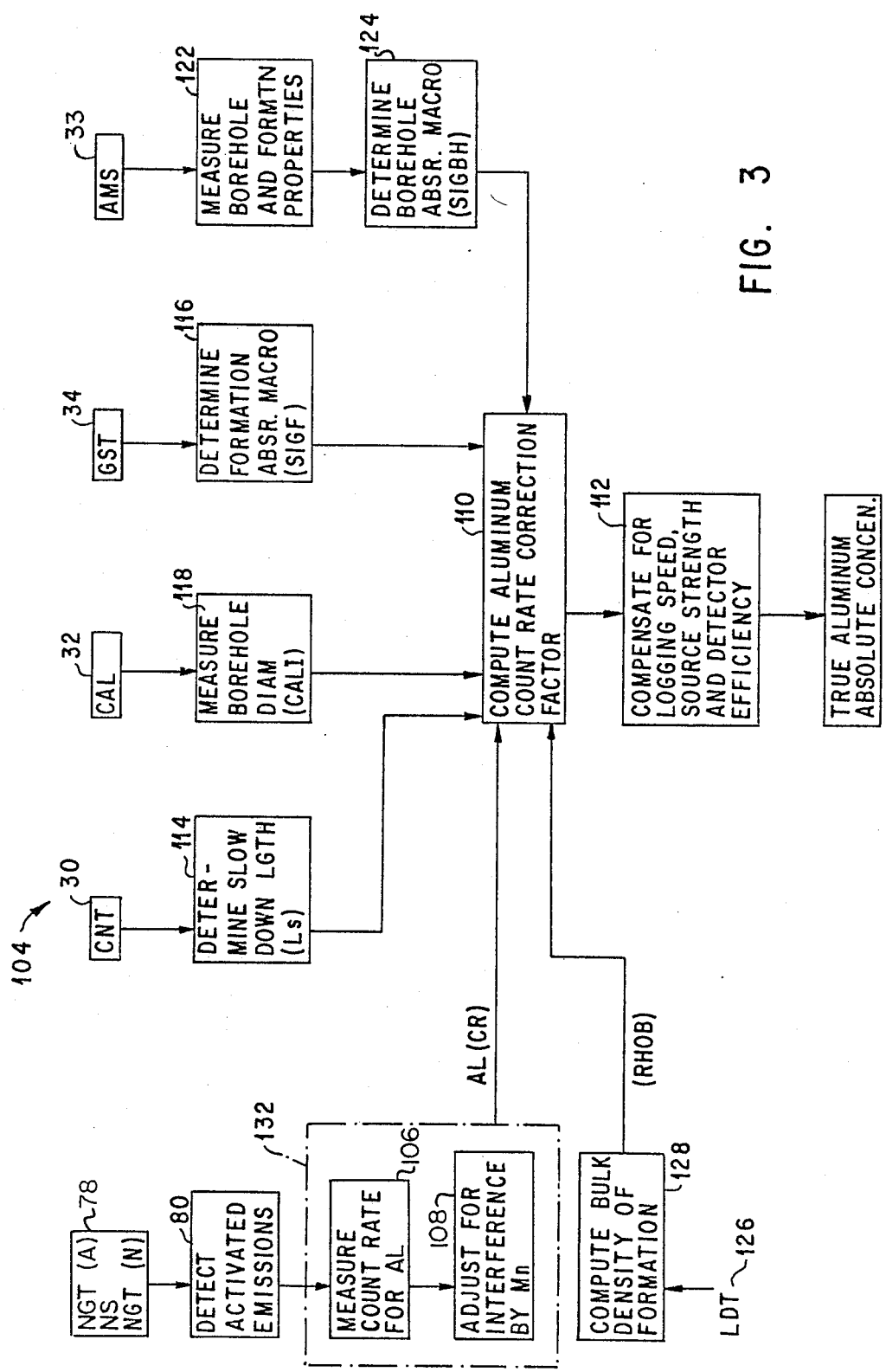
FIG. 3 is a schematic block diagram representing the preferred implementation of the invention based on determining the absolute concentration of aluminum as a first step in determining the absolute concentrations of other elements.

FIG. 3 shows in block diagram form, the relationship between the tool hardware and the determination of the absolute concentration of aluminum as indicated in block 104 of FIG. 2, which is in turn a submethod accomplished within the function of block 52 of FIG. 1. Hereinafter, the portion of the first tool system utilized in determining the absolute aluminum concentration, will be referred to as the ACT 78. The ACT includes a natural gamma ray spectroscopy tool 24, designated NGT(N), a low energy neutron source 30, designated NS, preferably californium-252, and another neutron spectroscopy tool NGT(A) 28 beneath the source 30. The components 24, 30, and 28 are represented within block 78 of FIG. 3, for the purpose of detecting a count rate of the activated aluminum gamma emissions commensurate with the aluminum concentration in the formation. The NGT(N) tool provides a natural background activity count rate measurement for correcting the aluminum measurement of the NGT(A). The NGT detector is typically of the sodium iodide type including associated photomultiplier tubes and electronic circuitry, as known in the art, for measuring the number and energy distribution of the gamma rays incident upon the detector. The NGT(N) tool 24 typically includes circuitry which defines five or more energy "windows" or brackets in which counts may be accumulated and which, in the past, were typically used for determining the naturally occurring concentrations of potassium (K), uranium (U), and thorium (Th). Typically, if as few as five windows are used, the first energy window spans an energy range from 0.15 to 0.5 MeV, a second window from 0.5 to 1.1 MeV, a third window from 1.1 to 1.6 MeV, a fourth window from 1.6 to 2 MeV, and a fifth window from 2 to 3 MeV. The uranium and thorium characteristic emissions fall in all the windows, and the potassiumn emission falls in the third window.

Figure 5:
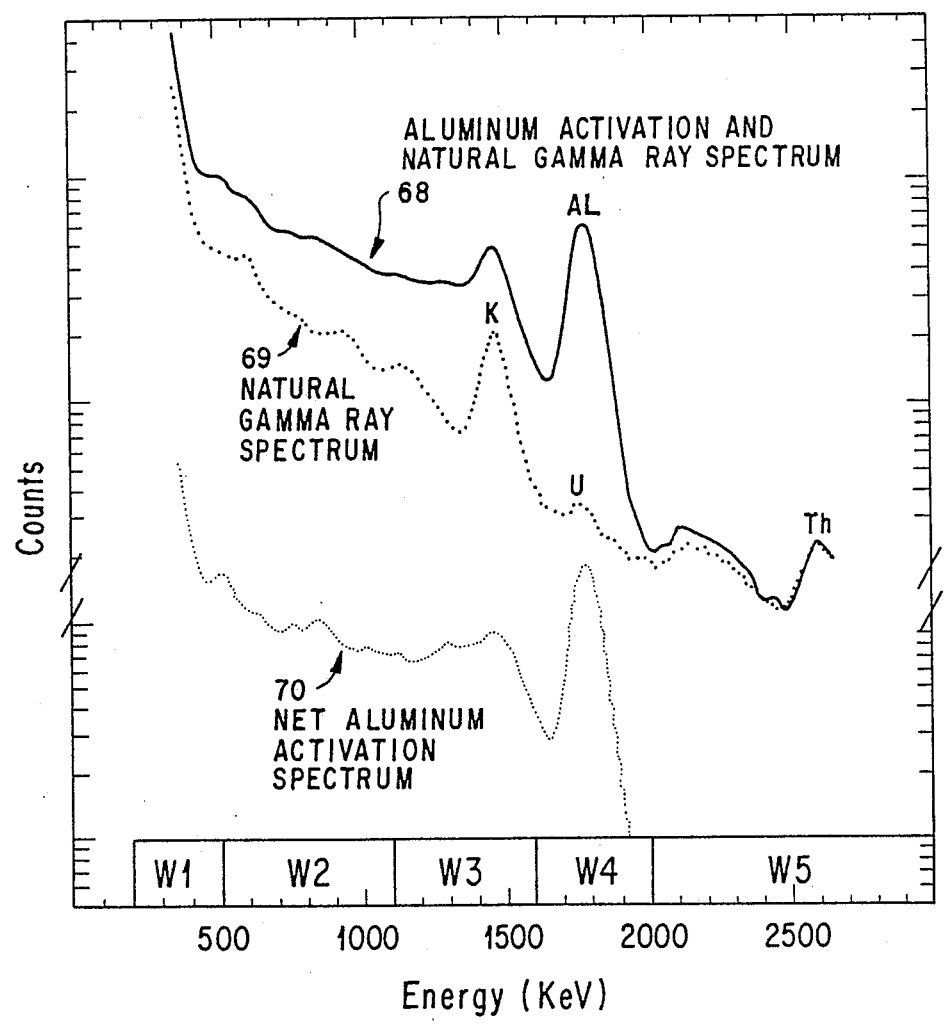
FIG. 5 is a graphic representation of the gamma ray spectrum and constituents as employed with the present invention.

In accordance with the invention the NGT tool, which was previously used only for natural gamma ray spectroscopy, is utilized in conjunction with the source 30 to obtain an activated aluminum count rate. If the neutron source has an energy distribution predominantly less than about 3.9 MeV, these neutrons slow down within the formation and are captured by the aluminum atoms, which in turn emit a delayed gamma ray at 1779 kev. This energy level falls near the midpoint of the fourth window of the NGT tool. Thus, the NGT type tool, when employed for activation analysis, will be referred to as the NGT(A) tool 28. By methods well known in this art, if the NGT(N) detector 24 measures the background count rate due to naturally radioactive elements and the NGT(A) detector 28 measures the total activity due to these elements and aluminum after activation by the source 30, then the background can be subtracted to provide a measured aluminum count rate as indicated at block 106 in FIG. 3, and as illustrated in FIG. 5.

It should be appreciated that the overall method of the present invention, and the technique for making an accurate measurement of the aluminum concentration, may be accomplished using a spectroscopy tool other than the NGT type described herein.

The measured count rate at block 106 is preferably further enhanced as indicated at blocks 108 to provide an aluminum count rate Al(CR) for further correction within the block 110. The corrected aluminum count rate is then modified by a calibration constant which is computed in block 112 and illustrated in FIG. 7, to generate a true aluminum concentration. The computation of the correction factor in block 110 is made in accordance with the following expression:

$$\text{(Al corrected)} = \frac{Al(CR)(L_s + k1)(SIGF + k2)(SIGBH)^{k3}}{RHOB(k4 + k5\ EXP(-CALI/k6))} \quad \text{Eq. 3}$$

wherein

Al(CR) is the aluminum count rate from block 108, $L_s$ is the neutron slowing down length of the formation, SIGF is the capture cross section of the formation, SIGBH is the capture cross section of the bore hole, RHOB is the bulk density of the fluid containing formation and assists in converting volume fraction to weight fraction, EXP is the exponential, and CALI is the diameter of the borehole.

$L_s$ can be determined in block 114 in any manner, but in the preferred embodiment of the invention a compensated neutron tool of the Type generally known under the trademark CNT type G, is used. This tool is described in U.S. Pat. No. 4,524,274 "Methods and Apparatus for Investigating an Earth Formation and Compensating for Bore Hole Environmental Effects". In the preferred embodiment of the present invention, the neutron source for the CNT tool 26 is the same source 30 as used by the NGT(A) tool, i.e., californium-252. As is well-known in this art, the slowing down length of a formation is the average distance a neutron will travel before its energy is reduced to a given level, typically the epithermal energy, e. g., 0.2 eV. $L_s$ can be determined from the CNT Type G tool by employing the technique described in *Geophysical Well Logging*, J. Tittman, Academic Press, Inc. (1986) pp. 23–27.

The value of CALI is determined in block 118 based on the caliper measurement from the CAL device 32 on the tool string (see FIG. 1). The CAL tool 32 typically includes a caliper 36 and an associated transducer 38. It should be understood, however, that the borehole diameter may be available a priori from previous operations in the borehole in which case the ACT would not include a CAL device 32.

The GST tool 34 is used primarily for determining the relative concentrations of the category II elements, but the tool also typically includes a source (not shown) of pulsed high energy neutrons, the behavior of which in the formation also provides a measure of the capture cross section of the formation, SIGF. The GST 34 typically includes about 256 energy windows. Detailed techniques for computing the formation capture cross section in block 116, from such a tool are described in, for example, U.S. Pat. Nos. 3,928,763, 3,930,153, and 3,930,154, the disclosures of which are hereby incorporated by reference.

The value of the capture cross section SIGBH for the bore hole cannot always be readily ascertained as a function of depth. An auxiliary measurement sonde (AMS) 33 may be used to measure the resistivity and temperature of the bore hole at block 122, from which the capture cross section may be determined at hole 124. In many situations, a constant value can be assumed for use at all depths, such value being determined from an analysis or knowledge of the particular type of mud fluid used in the borehole.

The parameter RHOB is, in effect, a conversion factor to convert the volume per cent to a weight per cent and is the bulk density of the formation. This can be measured at hole 126 by a tool known under the trademark LDT, as used by Schlumberger Technology Corp. and described in U.S. Pat. No. 4,048,495 entitled "Doubly-Compensated Dual-Detector Density Logging Apparatus". Thus, as shown in FIG. 3, the output from the LDT tool at 126 is used in block 128 to compute the bulk density of the formation, RHOB.

The particular values of the constants employed in equation 3, depend on the configuration of the tool string, including the type of source, the position of the source in the tool, the shielding of the source, etc. Values for these constants for an exemplary reduction to practice would be as follows:

K1 = 11.4
K2 = 13.7
K3 = 0.234
K4 = 1.0
K5 = 20.6
K6 = 2.48

After the expression identified above as Equation 3 has been computed in block 110, the true value of the aluminum concentration is determined at block 112 for use in determining the concentrations of other elements in the formation, as outlined in FIG. 2.

The ACT as described above is based on, but is a significant advance over, earlier attempts to measure aluminum concentration as set forth in the U.S. Pat. No. 3,665,195 and the article by Scott et al mentioned above in the Background of the Invention. The disclosures of these references are hereby incorporated by reference.

Figure 6:
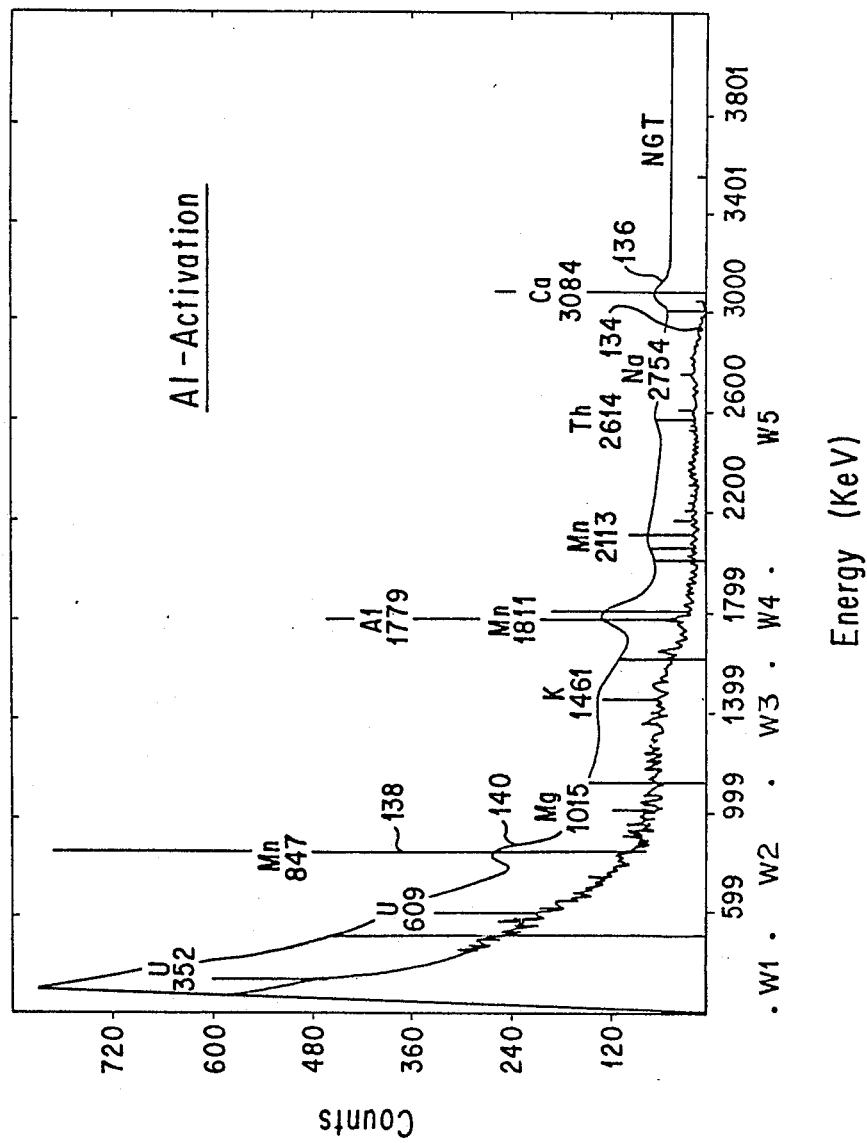
FIG. 6 is graphic representation of the gamma ray spectrum resulting from the neutron activation of the formation in accordance with the preferred embodiment of the invention for determining the absolute concentration of aluminum.
Figure 7:
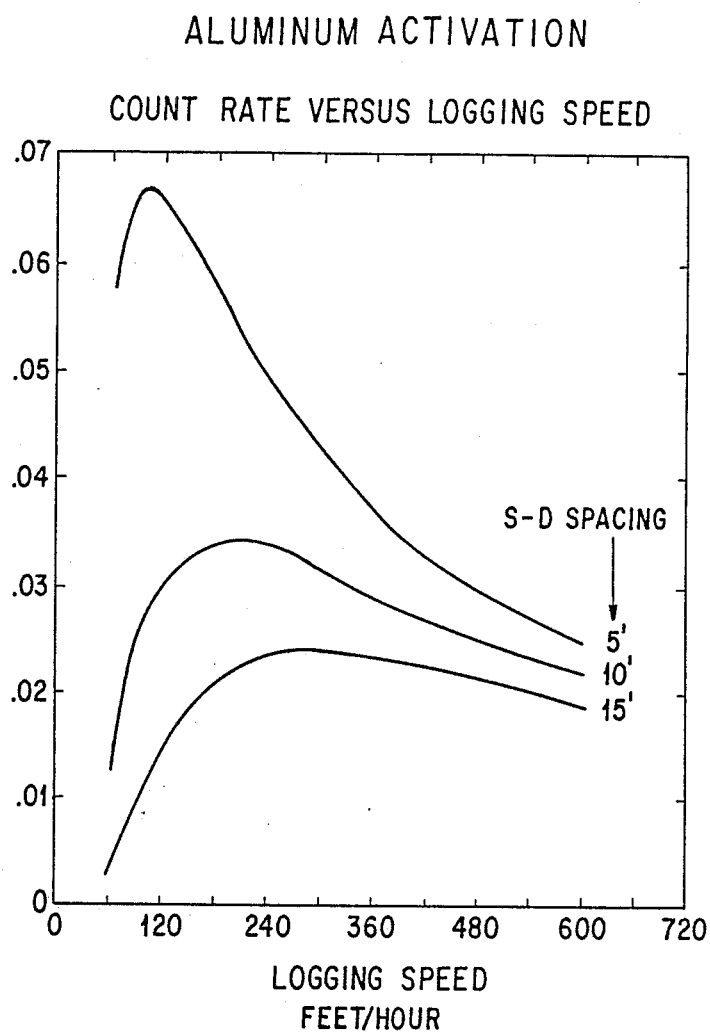
FIG. 7 is a graph illustrating the relationship between count rate and logging speed for use in determining the corrected value of the aluminum count rate.

FIGS. 5 and 6 show how the measured aluminum count rate is adjusted to take into account interferences by, for example, manganese, during the processing of the NGT output, as represented by the dashed box 132 in FIG. 3. The aluminum activation is the result of neutron capture by Al-27 (natural abundance 100%) resulting in Al-28 which decays by beta emission with a half life of 2.27 minutes. The decay product is Si-28 which emits a 1779 keV gamma ray. Other typical Cf-252 induced activations seen in formation sediments are listed in the following table:

| Target Isotope | Halflife | Production ($E_{65}$, keV) |
| --- | --- | --- |
| $^{23}$Na | 15 hours | $^{23}$Na(n,$\gamma$)$^{24}$Na($\beta$)$^{24}$Mg(2754,1369) |
| $^{26}$Mg | 9.45 min | $^{26}$Mg(n,$\gamma$)$^{27}$Mg($\beta$)$^{27}$Al(844,1014) |
| $^{37}$Cl | 37.2 min | $^{37}$Cl(n,$\gamma$)$^{38}$Cl($\beta$)$^{38}$Ar(2167,1642) |
| $^{48}$Ca | 8.7 min | $^{48}$Ca(n,$\gamma$)$^{49}$Ca($\beta$)$^{49}$Sc(3084) |
| $^{55}$Mn | 2.58 hours | $^{55}$Mn(n,$\gamma$)$^{56}$Mn($\beta$)$^{56}$Fe(1811,847) |

Of these elements, calcium and manganese are of special importance to the NGT aluminum activation. Activated manganese has a gamma line at 1811 keV which will cause an interference with the aluminum 1779 keV line. This can readily be seen in FIG. 6, which shows a high resolution spectrum 134 taken in a shaley portion of an open hole test well. The most significant gamma rays (and their energies) are identified in this activation spectrum, which was summed over about twenty feet of the well.

The high resolution spectrum was artificially broadened with a Gaussian filter to simulate the spectrum that would be observed with a sodium iodide based spectrometer as in the NGT tool, and this sodium iodide spectrum 136 is superimposed on top of the good resolution spectrum 134 in FIG. 6. It can be seen that the lower energy manganese line 138 can still be discerned by peak 140 at 847 keV in the sodium iodide spectrum. This peak 140 can be used to determine the contribution from the higher energy interfering manganese line at 1811 keV to make appropriate correction to the aluminum yield.

The five windows in the disclosed embodiment of the NGT tool are designated W1–W5 in FIGS. 5 and 6. Preferably, at least ne additional window is provided having sensitivity to the peak 140 at 847 keV, e.g., between 800 and 900 keV within W2. With reference to curves identified as 68, 69 and 70 in FIG. 5, the enhanced aluminum count rate can be expressed as $$Al(CR) = \sum_i CR_i \text{ (curve 68)} - \sum_i CR_i \text{ (curve 69)} -$$
$$\sum_j K_j CR_j \text{ (from curve 68) or, rewritten}$$
$$Al(CR) = CR(\text{curve 70}) - \sum_j K_j CR_j \text{ (from curve 68)}$$

where $K_j$ are predetermined constant(s) depending on the number and energy range of window(s) and where $CR_j$ and $CR_i$ are the count rates from windows j and i respectively, the windows j being the at least one additional window.

It should be appreciated that the NGT type tool has been found to conveniently provide a detection capability that permits a straight forward adjustment or enhancement of the aluminum activation count rate. It should be understood, however, that any other spectroscopy tool that provides the same function as that described herein, can be used with the present invention.

With reference now to FIG. 2, another subfeature of the invention will be described, directed to the content of dashed box 102. According to this subfeature of the invention, which will be more fully described in connection with FIG. 4, the determination of the relative concentrations obtained from the GST-type spectroscopy tool, are significantly improved.

Figure 4:
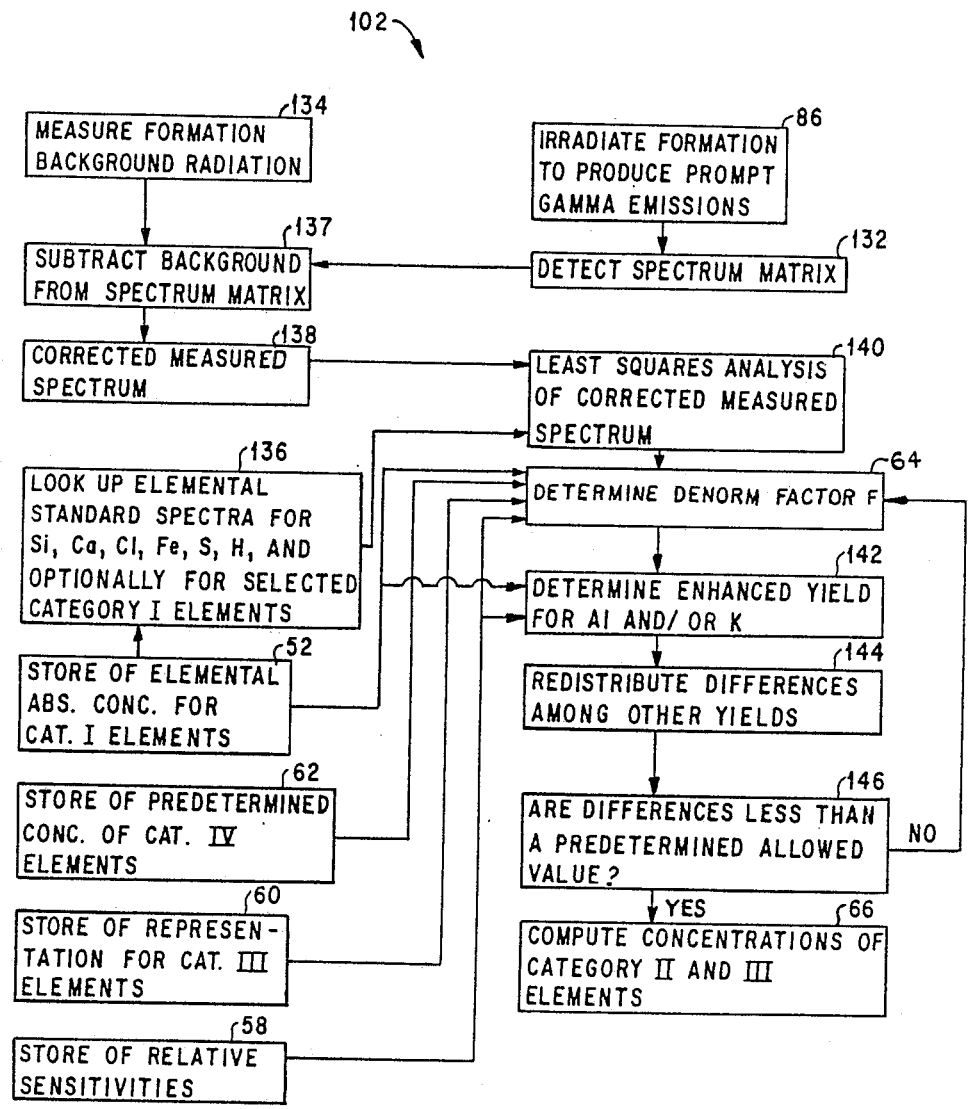
FIG. 4 is a flow diagram illustrating the preferred embodiment for improving known techniques for measuring relative concentrations of selected elements.

In accordance with this subfeature of the invention, the formation is irradiated as represented by block 86, and the resulting spectrum of gamma radiation is detected and recorded as represented in block 132. The preferred techniques for the preliminary steps of the method represented in FIG. 4 are more fully described in U.S. Pat. No. 3,521,064 "Analysis of Gamma Ray Energy Spectrum for Constituent Identification" and 4,055,763 "Neutron Characteristic and Spectroscopy Logging and Apparatus" and 4,394,574 "Methods and Apparatus For Constituent Analysis of Earth Formations". The GST tool 34 preferably used in this feature of the invention, includes hardware for measuring the activated background as represented in block 134. In block 136, a set of spectral standards are stored, representing known spectral responses of a set of elements whose response is fairly well understood. These elements can include silicon, calcium, chlorine, iron, sulfur, and hydrogen. In block 137, the measured background 134 is subtracted from the measured spectrum in block 132 to produce a spectral representation of a "corrected measured spectrum" at 138. The standard spectra from block 136 are then compared in block 140 with the detected spectrum from block 138, and a weighted least squares analysis is made in accordance with the technique described in said aforementioned patents. The details of a technique somewhat similar to that described up to this point with respect to FIG. 4, is disclosed in U.S. Pat. No. 4,317,993 "Method and Apparatus for Constituent Analysis of Earth Formations". The output of the least squares fitting routine typically employed in block 140, is a first level determination of the relative elemental concentrations of the standard elements represented in block 136.

In formations where clay is expected to be encountered, standard spectra for the elements such as titanium, gadolinium and potassium can be added to the set of standard spectra in block 136, even though titanium and gadolinium do not contribute significantly to the mass of the formation. A variation of this subfeature of the invention is to include within the elemental standard lookup spectra 136, a spectrum for a pseudoelement representing one or more constituents uniquely characterizing shale.

Aluminum and potassium, for example, can be measured with better statistical precision using category I methods; however, for optimum accuracy of the category II results, aluminum and potassium must also be included in spectral analysis of the category II method. The statistical precision of all the category II elements will be improved if the aluminum and potassium contributions can be fixed during the category II analysis. One way to accomplish this would be to use the absolute concentrations of aluminum and potassium determined from the category I method to predict appropriate spectral contributions due to aluminum and potassium from the category II spectrum, and then reanalyze this spectrum for only the remaining elements, excluding aluminum and potassium.

According to another subfeature of the invention, it is possible to avoid repeating the cumbersome spectral reanalysis part of this process. Equivalent results can be achieved by simply altering the elemental yields of the original analysis using a prescription which is orders of magnitutde less cumbersome than spectral fitting. The procedure is to force the yield of any elements that are independently determined to have a known value, including zero, by the substraction of an amount D(j) from its former value. This amount is then redistributed in amounts D(i) among the remaining elements according to a set of factors which are predicted by the weighted-least-square uncertainly matrix UM:

$$D(i)/D(j) = -UM(i,j)/UM(j,j)$$

where D(i) is the amount to be added to yield $Y_i$, and UM(i,j) and UM(j,j) are the i,j and the j,j elements of the weighted least square uncertainty matrix.

With reference now to FIG. 4, the statistical-precision-enhancement will be described step by step. It will be appreciated that an iterative procedure is needed since the determination of the enchanced yields for aluminum and potassium at 142 depends upon the denormalization factor, which in turn depends upon the enhanced yields. Once the enhanced yields for aluminum and potassium are determined, the differences between the enhanced yields and their previous values are redistributed among the other elements at 144 using the prescription described above. At 146 the magnitude of the differences is tested to see if another iteration is needed. If so, the denormalization factor is recomputed at 64 using the enhanced yields and the loop continues.

If not, the concentrations of the category II and III elements can be determined at 66.

It should be appreciated that, to this point in the description of the preferred embodiment, a generic system and procedure was described in FIG. 1, a generic equation for implementing the system and procedure was set forth as Equation 1, and subfeatures of the invention for determining the absolute concentrations of the category I elements and the relative concentrations of the category II elements were described with respect to FIGS. 2-6. The generic Equation 1 can now be restated with specificity, to reflect the preferred apparatus and procedures for determining the category I and category II absolute and relative concentrations. This equation is as follows:

$$\sum_j W_j + F \sum_i Y_i/S_i + \sum_u \sum_k C_{u,k} X_k + W = 100 \qquad \text{(Eq. 4)}$$

In the preferred implementation of the invention, the Category II elements (from the GST tool) can include silicon, calcium, iron, sulfur, gadolinium, potassium, and titanium. Gadolinium, potassium and titanium can be replaced by a pseudoelement representing shale, if desired. If the shale pseudoelement is included, it is derived from an "elemental38 standard composed of typical concentrations of gadolinium, samarium, potassium, titanium, aluminum and sodium. The shale sensitivity is then calibrated to give the weight percent of gadolinium, which is the largest contributor in this mix. The measured Category I element weights can include those of potassium from the the NGT and aluminum from the ACT.

For the category III elements, one of the non-zero coefficients $$\sum_u C_{u,k}$$

is for the unmeasured element u=carbon which correlates with the GST measured element k=calcium. $X_k$ would be represented as $FY_{ca}/S_{ca}$ where the $Y_{ca}$ and $S_{ca}$ are for calcium.

The other non-zero coefficients $C_{u,k}$ include all unmeasured elements u which correlate with the non-GST measured element K=aluminum. These can include sodium, magnesium, manganese, potassium and titanium. This can be parameterized as a single coefficient equal to $$\sum_u C_{u,k}$$

with k being aluminum. The value of this coefficient depends on which elements remain unmeasured. $X_k$ would be as $W_{al}$ in this case.

Figure 8:
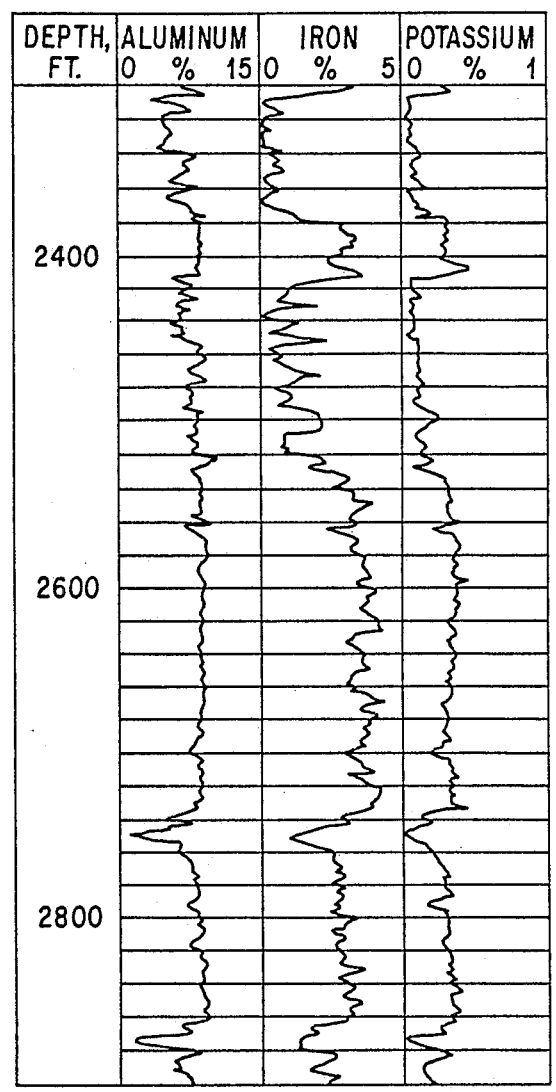
FIG. 8 is a representative log of the weight per cent of aluminium, iron and potassium as a function of borehole depth.

The foregoing Equation 4 is solved, and the denormalization factor F is computed, in functional block 64 of FIG. 1 and 2. This provides sufficient information to define the absolute concentrations of all elements in the selected group of elements of interest such that the values of elemental concentration at each desired depth in the borehole can be stored temporarily or permanently in storage block 50 as shown in FIG. 1. Typically, the elemental concentration values would be plotted as a function of borehole depth to produce a log such as shown in FIG. 8, where the concentrations for only three elements, aluminum, iron, and potassium are shown. Also, the elemental concentrations in store 50 can be accessed, virtually immediately, by additional information processing hardware which is adapted to perform a mathematical transformation operation whereby the mineralogy or other characteristics of the formation can be obtained from a vector having a plurality of elemental concentrations obtained from the store 50.

In yet another feature of the present invention, the concentration of an element in the formation which cannot be directly measured or determined by known techniques is estimated with sufficient accuracy to permit its explicit use in characterizing the mineralogy of the formation. As an example, the determination of the absolute magnesium concentration can help the user of the present invention distinguish dolomite from limestone, and therefore better quantify the porosity of the formation. The invention is based on a technical paper entitled "Litho-Density Tool Calibration", by D. Ellis et al, published by the Society of Petroleum Engineers (August 1985), which is hereby incorporated by reference. The measurement is preferably made by an LDT tool of the type disclosed in U.S. Pat. No. 4,048,495, entitled "Doubly-Compensated Dual-Detector Logging Apparatus".

The principle exploited for the density measurement is that the interaction of medium-energy gamma rays with rock formations is primarily a result of Compton scattering with electrons. As the gamma rays emitted from the source are successively scattered, however, their energy is reduced and they become increasingly subject to photoelectric absorption. Thus, this low energy attenuation is caused by photoelectric absorption. A quantitative representation of this photoelectric absorption is referred to in the literature and on log headings as Pe, the photoelectric factor.

The determination of the photoelectric factor is accomplished by measurement of the shape of the detected gamma ray spectrum with the LDT. The actual shape of the spectrum is dictated by the amount of photoelectric absorption in the formation. The low energy content of the spectrum is determined from the ratio of the counting rates in low energy to high energy windows. With a properly calibrated LDT, the photoelectric factor of the formation can be inferred from the relationship of the count rates in the high and low energy windows. The photoelectric factor thus measured, represents the average photoelectric absorption of the formation elemental constituents.

In this art, the photoelectric factor for an element is arbitrarily defined to be $(Z/10)^{3.6}$, where Z is the atomic number. By using this definition of the photoelectric factor for an individual element, and weighting each photoelectric factor by the weight percent of the formation contributed by each element, one can define the expected formation average photoelectric factor as follows:

$$P_e = \sum_n W_n \left( \frac{Z_n}{10} \right)^{3.6}$$

where $W_n$ is the weight percent of element n and $Z_n$ is its atomic number. This can, be written in the form of Equation (1) as $$P_e = \sum_j W_j \left( \frac{Z_j}{10} \right)^{3.6} + F \sum_i \left( \frac{Y_i}{S_i} \right) \left( \frac{Z_i}{10} \right)^{3.6} - \qquad \text{(Eq. 5)}$$

-continued
$$\sum_u \sum_k C_{u,k} X_k \left(\frac{Z_u}{10}\right)^{3.6} + W\left(\frac{Z}{10}\right)^{3.6} + W_a\left(\frac{Z_a}{10}\right)^{3.6}$$

where $W_a$ and $Z_a$ are the weight percent and the atomic number of the additional element which is not measured, known a priori, or correlated to one of the measured or known elements. Similarly, Equation 4 can be written as $$100\% = \sum_j W_j + F \sum_i Y_i/S_i + \sum_u \sum_k C_{u,k} X_k + W + W_a \quad \text{(Eq. 6)}$$

If the measured value of $P_e$ from an LDT is used, after correcting for the fluid contribution to the $P_e$ measurement, then Equations 5 and 6 give two equations in two unknowns, $W_a$ and F, and can then be solved to provide all of the elemental concentrations.

Since the $P_e$ measured by the LDT includes the effect of elements in both the rock and the fluid in the pores, it is necessary to remove the contribution to the measured $P_e$ from the fluid. To achieve this correction, it is necessary to know how much fluid is present, which can be determined from the epithermal neutron measurement of the CNT-G and the density measurement of the LDT. In addition, it is important to know the salinity of the fluid, which can be obtained from a GST measurement. Thus, the $P_e$ for the elements only in the rock can readily be calculated from the $P_e$ measurement.

Figure 9:
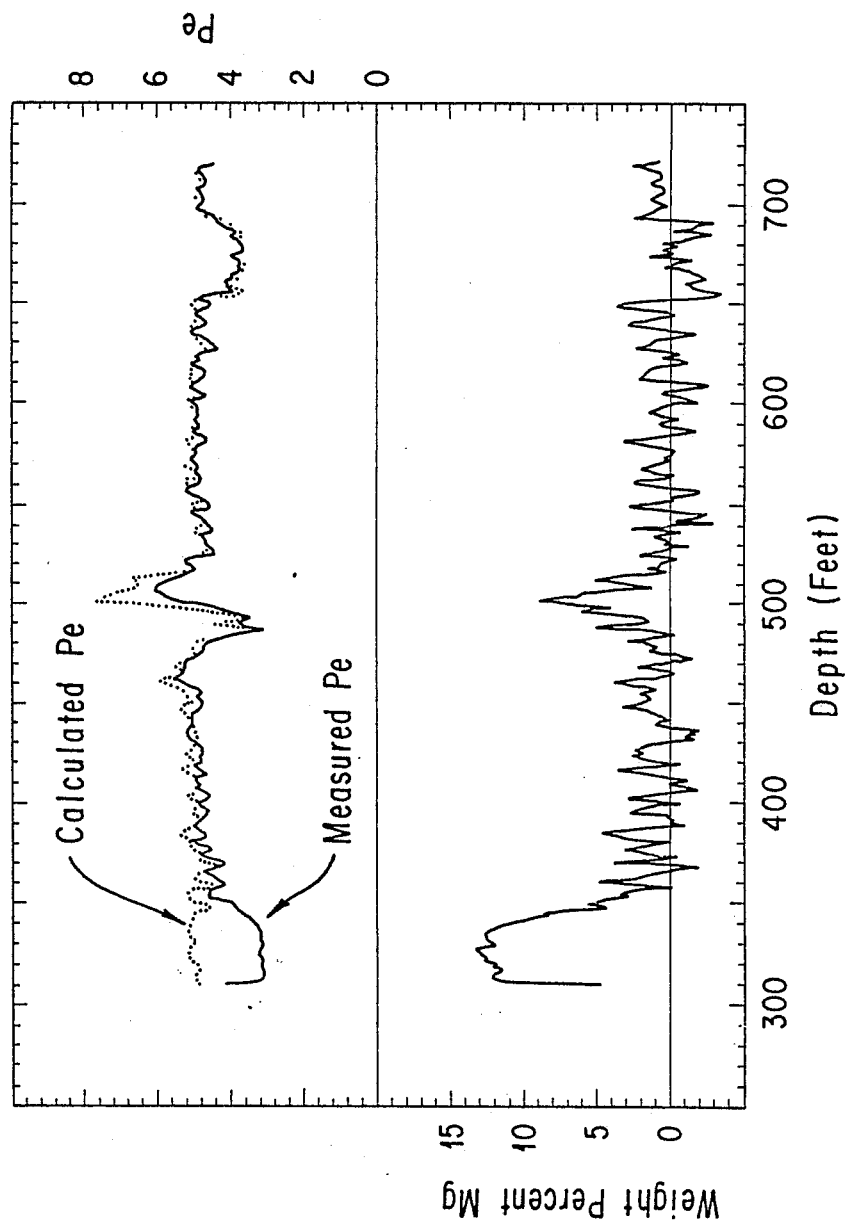
FIG. 9 is a log of the excess photoelectric factor for use in determining the concentration of magnesium in accordance with the present invention.

An example where the additional element is magnesium is illustrated in FIG. 9. The measured logged $P_e$ curve has already been corrected for the fluid in the pore space of the rock. The calculated $P_e$ curve is the value for the rock $P_e$ if $W_a$ is set equal to zero. Where the two curves diverge, between 310 and 355 feet and 490-520 feet, the difference is due to the presence of magnesium as would be calculated from the solution of Equations 5 and 6 for $W_a$.

In accordance with the preferred embodiment of the invention, it should be understood that the term represented by W in Equation 4 is assumed to be representative primarily of the oxygen content of the rock portion of the formation. Accordingly, the atomic number to be used in computing the average formation photoelectric factor would be 8 for the W term. It should also be appreciated that magnesium may in some instances be represented in Equation 4 in the third term, by an estimate of a correlation factor between magnesium and some other element represented in first or second terms of the equation. Therefore, implementation of the present feature of the invention may be based on an apparent concentration distribution in which magnesium may or may not be included. Where magnesium was not initially included, the total magnesium concentration after implementation of the invention, would be based on the overestimation of the photoelectric factor only. Where magnesium was initially represented in the apparent concentration distribution, the additional magnesium contribution derived from the overestimated photoelectric factor must be added to the initial value. If magnesium is not present or can be completely accounted for as a category III element, then it should be apparent that an additional element, such as sodium, which may be present in feldspar, can be determined for solving Equations 5 and 6.

It should be evident from the foregoing detailed description that the present invention provides a method and apparatus for logging the absolute elemental concentrations of a plurality of selected elements in an earth formation. The preferred embodiment of the invention includes several novel subfeatures which, when utilized together, provide the most accurate determination of concentrations. It should be understood, however, that some of the subfeatures of the invention may be omitted, or less accurate techniques substituted, without departing from the broad aspects of the invention. Likewise, some of the novel subfeatures of the invention may be beneficially utilized with methods or apparatus differing to some extent from the overall method and apparatus described herein, without detracting from the novelty of such subfeatures.

We claim:

1. A method for determining the absolute weight percent concentrations of a selected group of elements in an earth formation having a rock matrix and a contained fluid surrounding a borehole, comprising the steps of:

passing a tool string through the bore hole to obtain spectroscopy data indicative of the presence of elements to be measured, said elements to be measured being a subset of said group of elements and consisting of a first category having at least one element whose absolute weight percent is to be measured and a second category having at least two elements whose relative weight percent is to be measured;

processing the spectroscopy data to obtain the absolute weights percent of the elements in said first category;

processing the spectroscopy data to obtain the relative weights percent of the elements in said second category;

correlating the absolute weights percent of each element in a third category of elements chosen from among the elements of said group that are not in the first or second categories, with one of the measured absolute or relative weights percent for an element in said first or second categories, respectively;

storing a predetermined constant value representing the weight percent of a fourth category of elements consisting of the elements in the formation not included in the first, second and third categories;

forming a mathematical relationship in which the weights percent in said first, second, third and fourth categories are expressed as weights percent relative to the weight of all elements in the rock matrix of the formation; and determining from said mathematical relationship a denormalization factor from which the relative weights percent of the elements in the second category are converted to absolute weights percent and the concentrations of any elements in the third category that are correlated with an element in said second category, are expressed as absolute weights percent.

2. The method of claim 1 wherein an element in said fourth category is oxygen and said predetermined constant value is about 50 percent of the weight of all elements in the rock matrix.

3. The method of claim 1 wherein one of the elements in said second category is a pseudo element representing the elements gadolinium, potassium and titanium.

4. The method of claim 1 wherein the absolute weight percent concentration of at least one element in said first category is used in the step of processing the spectroscopy data of said second category to obtain the relative weight percent concentrations of the elements in said second category.

5. The method of claim 1 wherein said first category includes aluminum, said second category includes calcium, and said third category includes carbon.

6. The method of claim 5 wherein the weight percent concentration of carbon is correlated with the weight percent concentration of calcium.

7. The method of claim 5 wherein said third category includes titanium and sodium, and the weight percent concentrations thereof are correlated with the weight percent concentration of aluminum.

8. The method of claim 1 wherein, (a) the step of passing a tool string includes passing a first logging tool system through the borehole to measure at each depth in the formation the weight percent of each element of the first category of elements in said group relative to the weight of all elements in the formation, said first category including at least aluminum, the weight percent of each element in said first category being represented by $W_j$, and passing a second logging tool system through the borehole to measure at each depth the weight percent of each element of the second category of elements in said group relative to the other elements in said second category, the relative weight percent of each element in said second category represented by $W_i'$, (b) the step of correlating includes representing the weight percent of each of the elements in the third category of elements in said group relative to the weight of all elements in the formation, said third category including the element carbon, by forming a quantitative relationship between the weights percent of selected elements in at least one of said first and second categories and a correlation factor, the weight percent of each element in said third category being represented by $W_u$; and (c) the steps of forming a mathematical relationship and converting relative to absolute concentrations includes, (i) combining each of the elemental weight percent representations in the first, second, third and fourth categories into an equation having the form, $$\left[ \sum_j W_j + F \sum_i {}^*W_i' + \sum_u W_u + W = 100 \text{ percent} \right]$$

$$\sum_j W_j + F \sum_i W_i' + \sum_u W_u + W = 100 \text{ percent}$$

wherein W is said predetermined constant value and F is said denormalization factor, (ii) determining the value of F at each depth by solving said equation for F, (iii) determining the weight percent of each element in said second category by the operation $W_i = FW_i'$, and (iv) storing the values of the absolute elemental concentrations of said group in a data storage device.

9. The method of claim 8 wherein $W_i$ has the form $Y_i/S_i$, where $Y_i$ is the measured spectral yield for rock element i and $S_i$ is the weight percent sensitivity of said second tool system to rock element i.

10. The method of claim 9 wherein said second category of elements includes calcium, silicon, iron, and sulfur.

11. The method of claim 10, wherein an element in said fourth category is oxygen.

12. The method of claim 11 wherein the absolute weight percent of oxygen is predetermined to be about 50%.

13. The method of claim 10, wherein said first category further includes potassium, thorium, and uranium.

14. The method of claim 10 wherein said correlation factor is of the form $C_{u,k'}$ for an element u in the third category in terms of measured element k, and $W_u$ as in the form, $$W_u = \sum_k C_{u,k} X_k$$

where $X_k$ is the absolute weight percent representation of element k.

15. The method of claim 14 wherein each value of $X_k$ is either $FY_i/S_i$ or $W_j$.

16. The method of claim 10 wherein said second category of elements further includes gadolinium, titanium, and potassium.

17. The method of claim 16 wherein said third category of elements includes sodium, manganese and magnesium.

18. The method of claim 10 wherein the weight percent of carbon is correlated with the percent of calcium.

19. The method of claim 10 wherein the weights percent of the elements in the third category, other than carbon, are correlated with the weight percent of aluminum.

20. The method of claim 10 wherein a plurality of elements in the material shale are represented in the second category as a single pseudo element.

21. The method of claim 20 wherein the pseudo element represents one or more of gadolinium, potassium, and titanium.

22. The method of claim 8 wherein said first tool system and said second tool system each include means for irradiating the formation with neutrons and means for detecting gamma radiation resulting from neuron capture by the elements in said first and second categories, respectively.

23. The method of claim 22, wherein said fourth category of elements includes oxygen.

24. The method of claim 23 wherein said second category of elements includes calcium, silicon, iron, and sulfur.

25. The method of claim 24 wherein the weight percent of carbon is correlated with the weight percent of calcium.

26. The method of claim 25 wherein the weights percent of elements in the third category, other than carbon, are correlated with the weight percent of aluminum.

27. The method of claim 26, wherein said first category further includes potassium.

28. The method of claim 27 wherein said third category of elements includes sodium, manganese and magnesium.

29. A system for logging the absolute weight percent concentrations of a selected group of elements in the rock matrices at various depths in an earth formation surrounding a well borehole, comprising:

first means for determining the absolute weight percent of each element in a first category of elements in the rock matrix of the formation at each selected depth;

second means for irradiating the formation with neutrons and measuring the resulting gamma ray relative yields for each element of a second category of rock matrix elements at each of said selected depths;

means for storing a data base of values commensurate with the sensitivity of said second means to the individual elements in said second category of elements;

means for determining the absolute weights percent of a third category of rock formation elements including carbon from the weight percent determined for at least one element of said first and second categories of elements;

means for storing a predetermined absolute weight percent of a fourth category of rock formation elements including oxygen;

means operatively connected to said first means, said second means, said means for storing a data base, and said means for storing a predetermined weight percent, for determining at each selected borehole depth the value of F and the absolute weight percent $W_i = FY_i/S_i$ of each of the elements in said second category from the equation, $$\sum_j W_j + F \sum_i Y_i/S_i + \sum_u \sum_k C_{u,k} X_k + W = 100 \text{ percent}$$

where

F = a denormalization factor for the elements in the second category, $Y_i$ = measured gamma ray yield for rock element i in the second category, $S_i$ = weight percent sensitivity of the second means for element i, $W_j$ = absolute weight percent of element j in the first category, $X_k$ = weight percent pf element k from the first or second categories, $C_{u,k}$ = correlation coefficients for the elements u from the third category in terms of measured elements k, w = a predetermined constant value of the residual weight fraction including oxygen which represents the elements in the fourth category; and means for recording selected elemental concentrations for each depth in the borehole.

30. The system of claim 29 wherein said first means includes means for irradiating the formation with neutrons, means for detecting the gamma ray emission form neutron capture for a selected element E in the first category, and means for generating a count rate E(CR) from said gamma ray emissions commensurate with the concentration of said selected element E in the formation, and wherein said system further includes:

means for measuring the diameter of the borehole (CALI);

means for measuring the macroscopic capture cross section of the borehole (SIGBH);

means for measuring the slowing down length of neutrons in the formation ($L_s$);

means for measuring the macroscopic capture cross section of the formation (SIGF);

means for determining the bulk density of the formation including contained fluids (RHOB); and means for correcting the count rate of said selected element as a function of said diameter, said borehole macroscopic cross section, said slowing down length, said formation macroscopic cross section and said bulk density.

31. The system of claim 30 wherein said corrected count rate is determined in accordance with the expression, $$\left[ Al = \frac{Al(cr)^*(L_s + k1)^*(SIGF + k2)^* (SIGB)^{k3}}{RHOB^*(k4 + k5^*\exp(-CALI/k6))} \right]$$

$$E(\text{corrected}) = \frac{E(cr)^*(L_s + k1)^*(SIGF + k2)^* (SIGBH)^{k3}}{RHOB^*(k4 + k5^*\exp(-CALI/k6))}$$

where k1, k2, k3, k4, k5, and k6 are predetermined constants.

32. The system of claim 31 wherein said first category includes aluminum.

33. The system of claim 29 wherein said first category includes aluminum.

34. The system of claim 33 wherein said means for irradiating the formation emits neutrons having energies predominantly below about 3.9 MeV.

35. A system for logging as a function of depth a plurality of subsurface formations penetrated by a borehole comprising:

means for measuring as a function of borehole depth, the naturally occurring radiation of the formations and for generating a first signal commensurate with to the absolute weight percent of naturally occurring potassium in the formation;

means for irradiating the formations with neutrons having energies predominantly less than 3.9 MeV;

means for detecting as a function of borehole depth the gamma ray emission resulting from thermal capture of said neutrons by aluminum in the formations and generating a second signal commensurate with the absolute weight percent of naturally occurring aluminum in the formation;

means for irradiating the formations with high energy neutrons and for generating a plurality of third signals as functions of borehole depth, each of said third signals being commensurate with the weight percent of one element of the set consisting of at least iron, silicon, calcium and sulfur relative to the weight of all elements in said set, from the radiation resulting from thermal neutron capture in the formation elements in response to said high energy neutrons;

means for processing said first, second and third signals to determine a denormalization factor for converting said third signals into a respective plurality of fourth signals commensurate with the absolute weight percentages in the formation for each element in said set.

36. A method for measuring the activation radiation resulting from thermal neutron capture of aluminum contained in an earth formation surrounding a borehole, comprising the steps of:

irradiating the formation with a source of neutrons having dominant energies less than about 3.9 MeV;

measuring the activation radiation from thermal neutron capture by at least aluminum and manganese in the formation, with a spectrum analyzer having a plurality of energy range windows including a first energy window spanning an energy range including 1779 keV and 1811 keV;

measuring the activation radiation resulting from the thermal neutron capture by manganese in the formation, with said spectrum analyzer having a second energy window optimally sensitive to gamma rays at 847 keV;

processing the measured activation radiation from at least said first window to determine a total count rate due to aluminum and manganese activation radiation;

processing the measured activation radiation from said second window to determine a count rate due to manganese activation radiation; and subtracting a count rate which is dependent on the manganese activation radiation in said second window from the total count rate due to aluminum and manganese activation radiation to obtain an adjusted aluminum activation count rate.

37. A method for determining the absolute concentration of an element E in an earth formation surrounding a well borehole, comprising the steps of:

measuring the delayed gamma ray activity resulting from the capture of thermal neutrons in the formation to obtain a count rate E(CR) indicative of the concentration of said element at various depths in the formation;

determining the macroscopic capture cross section (SIGF) of the formation;

determining the neutron slowing down length in the formation (Ls);

determining the macroscopic capture cross section (SIGBH) of the borehole;

determining the borehole diameter (CALI);

determining the bulk density of the formation (RHOB) including fluids contained therein;

computing a corrected count rate E in accordance with a predetermined relationship in which a correction factor to said count rate E(CR) is functionally dependent upon SIGF, $L_s$, SIGBH, CALI, and RHOB; and recording the value of the corrected count rate at a plurality of depths in the borehole.

38. The method of claim 37 wherein said predetermined relationship has the form:

Corrected count rate =

$$\frac{Al(CR)(L_s + K1)(SIGF + K2)(SIGBH)K3}{RHOB(K4 + K5\ EXP(-CALI/K6))}$$

$$E(\text{corrected}) = \frac{E(CR)(L_s + K1)(SIGF + K2)(SIGBH)K3}{RHON(K4 + K5\ EXP(-CALI/K6))}$$

wherein K1, K2, K3, K4, K5, and K6 are predetermined constants.

39. The method of claim 38 wherein said element is aluminum.

40. The method of claim 39 wherein the values for said predetermined constants are approximately:
K1=11.4
K2=13.7
K3=0.234
K4=1.0
K5=20.6
K6=2.48

41. A method for logging the concentration of a selected element of a group of element present in an earth formation surrounding a borehole when the apparent concentration of each element in the group is known, comprising:

determining at a plurality of depths in the borehole, the apparent absolute weight percent concentration of each of the formation elements in the group;

for each of said plurality of depths, estimating the formation average photoelectric factor by computing a weighted average of the elemental photoelectric factors for said apparent absolute weights percent;

logging the formation average photoelectric factor;

obtaining the difference between the logged photoelectric factor and the computed weighted average photoelectric factor at each of said plurality of depths, said difference being indicative of the actual additional weight percent of said selected element relative to the apparent weight percent of said selected element;

determining the value of said additional weight percent of said selected element at each of said plurality of depths, by solving for the additional weight percent of said selected element that makes the computed weighted average photoelectric factor equal to said logged photoelectric factor; and recording the total of the apparent and additional weight percent concentration of said selected element at each of said plurality of depths.

42. The method of claim 41 further including the steps of, representing as a variable $W_a$ a weight percent contribution of one of said selected elements that is additional to the weight percent representation of said one element in said first, second, third or fourth categories;

establishing a first quantitative relationship in the form $$\sum_j W_j + F\sum_i W'_i + \sum_u W_u + W + W_a = 100\%$$

where $W_j$, $W'_i$, $W_u$, and W are the weights percent of each of the elements in the first, second, third and fourth categories respectively and where F is a denormalization factor;

logging the photoelectric factor $P_e(\log)$ of the rock matrix of the formation;

establishing a second quantative relationship in the form $$P_e = \sum_j W_j \left(\frac{Z_j}{10}\right)^{3.6} + F\sum_i W'_i \left(\frac{Z_i}{10}\right)^{3.6} +$$

$$\sum_u W_u \left(\frac{Z_u}{10}\right)^{3.6} + W\left(\frac{2}{10}\right)^{3.6} + W_a\left(\frac{Z_a}{10}\right)^{3.6}$$

where $Z_n$ is the atomic number for each of the elements;

wherein the steps of forming a mathematical relationship and determining a denormalization factor include determining from said first and second quantitative relationships a consistent pair of values for F and $W_a$;

determining the weight percent of each, element in said second category by the operation $W_i = FW'_i$; and obtaining the total weight percent of said one element by adding to $W_a$ the weight percent, if any, of said one element as represented in the first, second, or third categories.

43. The method of claim 42 wherein, $W_i'$ has the form $Y_i/S_i$ where $Y_i$ is the value of the measured spectral yield for rock element i and $S_i$ is the value of the weight percent sensitivity of the measurement tool to rock element i;

Wu has the form $$W_u = \sum_k C_{u,k} X_k$$

where $X_k$ is the absolute weight percent representation of element k, and $C_{u,k}$, is a correlation factor for the weight percent of an element u not in said first or second categories in terms of a measured element k; and W represents only oxygen and constitutes about 50% of the weight of all elements in the rock matrix of the formation.

44. The method of claim 43, wherein said one element is magnesium.

45. A method for determining the absolute weight percent concentrations of a selected group of elements in an earth formation including a rock matrix and a contained fluid surrounding a borehole, comprising:

detecting first signals indicative of the absolute concentrations of a first category of elements in the rock matrix;

irradiating the formation with a pulse of high energy neutrons to produce a second signal detected as indicative of the relative concentrations of a second category of elements in the rock matrix;

form said first signals and said second signal respectively, determining the absolute and relative weight percent concentrations of the elements in said first and second categories of elements respectively; and combining said determined absolute and relative weight percent concentrations to transform at least one of said relative weight percent concentrations used in the combination into an absolute weight percent concentration.

46. The method of claim 45 wherein the step of combining said determined absolute and relative weight percent concentrations includes establishing a predetermined weight percent of oxygen in the rock matrix.

47. The method of claim 46 wherein said step of combining said determined absolute and relative weight percent concentrations further includes the step of correlating the weight percent concentrations of each of a plurality of elements in a third category whose concentrations were not determined from said first and second signals, with the weight percent concentrations of at least some of the elements in said first and second categories.

48. The method of claim 47 wherein one of the elements in said first category is aluminum, and wherein at least one of the elements in said third category is correlated with the absolute weight percent of aluminum.

49. The method of claim 45 wherein said second category of elements includes at least one element whose absolute weight percent is known and wherein the processing of the spectroscopic data to obtain the relative weights percent of the elements in said second category includes the steps of, measuring the background gamma radiation in the formation;

irradiating the formation with high energy neutrons and measuring the resulting prompt gamma emission spectrum;

subtracting the background gamma radiation from the prompt emission spectrum to produce a correlated measured spectrum;

comparing the corrected measured spectrum with a plurality of element standard spectra and utilizing the parameter $Y_i/S_i$ with a least squares analysis to obtain a first level determination of the relative elemental concentrations of the elements in said second category, wherein $Y_i$ is the gamma yield and $S_i$ is the measuring sensitivity for each element i;

forcing the yield of said element whose concentration is known to a value which corresponds to said known concentration, and redistributing the difference between the yield inferred from the least squares analysis and the yield corresponding to the known concentration, among the yields of the remaining elements in said second category.

50. The method of claim 49 wherein said redistribution is made according to a set of factors predicted by the weighted least squares least squares uncertainty matrix UM as follows:

$$D(i)/D(j) = -UM(i,j)/UM(j,j),$$

where $D(i)$ is the amount to be added to yield Yi and $UM(i,j)$ and $UM(j,j)$ are the i,j and the j,j elements of the weighted least squares uncertainty matrix.

51. A method for determining the composition of an unknown formation material through which a borehole passes, which material includes a plurality of postulated constituent elements, comprising the steps of:

for a selected postulated constituent element, measuring the absolute weight percent concentration in said formation;

detecting the energy spectrum of gamma ray count rates produced by said plurality of postulated elemental constituents of the unknown material;

from said measurement of the absolute weight percent concentration of said selected element, predicting the detected gamma ray count rates due to said selected element;

removing the spectral contribution to said detected spectrum due to the contribution of said selected element to establish a net detected spectrum;

comparing the net detected spectrum with a composite spectrum of predetermined weighted standard spectra of the postulated constituents excluding said selected element to obtain values relating to the proportions of the postulated constituent elements; and recording the obtained values.

52. The method of claim 51 wherein said selected element is aluminum.

53. The method of claim 51 wherein said selected element includes potassium.

54. The method of claim 51 wherein the weighted standard spectra include spectra for at least one of the elements titanium, gadolinium, and potassium.

55. The method of claim 51 wherein the weighted standard spectra include a spectrum for a pseudoelement that uniquely characterizes shale.

56. The method of claim 55 wherein the shale pseudo-element spectrum is representative of the typical concentration of gadolinium, samarium, potassium, titanium, aluminum, and sodium in shale.

57. A logging system having a mode of operation for obtaining information regarding the chemical constitution of an earth formation surrounding a borehole comprising;
   a first tool system including a natural gamma ray detector for detecting gamma rays emitted from the naturally radioactive elements in the formation, a continuous source of neutrons for irradiating the formation in order to activate at least the element aluminum, and a first detector means for detecting gamma rays originating from elements in the formation activated by the neutrons from said continuous source, said first tool, said continuous source, and said first detector means being connected to one another such that, when the first tool system is moved through said borehole in its operating mode, said natural gamma ray detector precedes said continuous source which in turn precedes said first detector means; and
   a second tool system connected to at least one of said natural gamma ray detector, continuous source, and first detector means, said second tool including a high energy, pulsable neutron source for irradiating the formation with pulses of high energy neutrons and a second detector means for detecting the energy spectrum of gamma rays originating from elements in said formation that have been irradiated by neutrons from said high energy neutrons source.

58. The logging system of claim 57, wherein said continuous source of neutrons is carried by a neutron porosity tool having means for detecting neutrons returning to said borehole from said formation.

59. The logging system of claim 58, wherein said continuous source of neutrons is californium 252.

60. The logging system of claim 57, wherein said first tool system further includes means for determining properties of the borehole and its fluid contents.

61. The logging system of claim 57 wherein the first and second tool systems are connected one to another such that, when said logging system is moved through the borehole in its operating mode, the second tool system follows the first tool system, and wherein the second tool system is oriented such that said high energy neutron source follows said second detector means.

62. A method for measuring the activation radiation resulting from thermal neutron capture by a first element contained in an earth formation surrounding a borehole, comprising the steps of:
   irradiating the formation with a source of neutrons having dominant energies less than about 3.9 Mev;
   measuring the activation radiation from thermal neutron capture by at least said first element and a second element in the formation, with a spectrum analyzer having a plurality of energy range windows, one of said windows being optimally sensitive to gamma rays emitted by said first and second elements;
   measuring the activation radiation resulting from the thermal neutron capture by the second element in the formation, with said spectrum analyzer having a second energy window optimally sensitive to gamma rays emitted by said second element in an energy window outside of said first window;
   processing the measured activation radiation from at least said first window to determine a total count rate due to said first and second element activation radiation;
   processing the measured activation radiation from said second window to determine a count rate due to the second element activation radiation; and
   subtracting a count rate which is dependent on the second element activation radiation in said second window from the total count rate due to the first and second element activation radiation to obtain an adjusted activation count rate for said first element.

63. The method of claim 62, wherein said first element is aluminum, and said second element is magnesium.

64. The method of claim 62 wherein said first element is aluminum and said second element is calcium.

65. A method for determining the composition of an unknown formation material through which a borehole passes, which material includes a plurality of postulated constituent elements, comprising the steps of:
   establishing a non-negative value for the absolute weight percent concentration of a selected postulated constituent element;
   detecting the energy spectrum of gamma ray count rates produced by said plurality of postulated elemental constituents of the unknown material;
   minimizing the difference between the detected energy spectrum and a composite spectrum of predetermined weighted standard spectra of the postulated constituents utilizing a least squares analysis including the parameter $Y_i/S_i$, wherein $Y_i$ is the gamma yield and $S_i$ is the measuring sensitivity for each postulated constituent element i;
   forcing the yield of said selected element in the least squares analysis to a value which corresponds to said established weight percent concentration; and
   redistributing the difference between the yield inferred from the least squares analysis and the yield corresponding to the established concentration, among the yields of the other postulated constituent elements.

66. The method of claim 65 wherein the least squares analysis includes the calculation of a weighted least squares uncertainty matrix UM, and wherein said redistribution is made according to a set of factors predicted by the matrix UM as follows;

$$D(i)/D(j) = -UM(i,j)/UM(j,j),$$

where D(i) is the amount to e added to yield Yi and UM(i,j) and UM(j,j) are the i,j and the j,j elements of the weighted least squared uncertainty matrix.

67. The method of claim 65 wherein said selected element is aluminum.

68. The method of claim 65 wherein said selected element includes potassium.

69. The method of claim 66 wherein said selected element is aluminum.

70. The method of claim 66 wherein said selected element includes potassium.

71. The method of claim 65 wherein the weighted standard spectra includes a spectrum for at least one of the elements titanium, gadolinium, and potassium.

72. The method of claim 65 wherein the weighted standard spectra includes a spectrum for a pseudoelement that uniquely characterizes shale.

73. The method of claim 72 wherein the shale pseudoelement spectrum is representative of the typical concentrations of gadolinium, samarium, potassium, titanium, aluminum, and sodium in shale.

74. The method of claim 66 wherein the non-negative value is measured through said borehole.

75. The method of claim 66 wherein the non-negative value is set equal to zero.

76. The method of claim 66, wherein said non-negative value is a computed variable.

77. A method for determining the absolute weight percent concentrations of a selected group of elements in an earth formation including a rock matrix and a contained fluid surrounding a borehole, comprising:
  passing a tool string through the borehole;
  detecting in the tool string first signals indicative of the absolute concentrations of a first category of elements in the rock matrix;
  irradiating the formation with a source of neutrons from the tool string to produce a second signal detected in the tool string as indicative of the relative concentrations of a second category of elements in the rock matrix;
  from said first signals and said second signal respectively, determining the absolute and relative weight percent concentrations of the elements in said first and second categories of elements respectively; and
  combining said determined absolute and relative weight percent concentrations to transform at least one of said relative weight percent concentrations used in the combination into an absolute weight percent concentration.

78. The method of claim 77 wherein the first signal is commensurate with the natural gamma radiation i the formation.

79. The method of claim 78 wherein the second signal is commensurate with the activated gamma radiation in the formation resulting from irradiating the formation with said source of neutrons.

80. The method of claim 77 wherein the first category of elements includes at least one of the elements of aluminum and potassium.

81. The method of claim 80 wherein the step of transforming includes correlating the absolute concentration of one of said elements in the second category with the absolute concentration of one of said at least one elements of the first category.

* * * * *